US011835365B2

(12) United States Patent
Liu et al.

(10) Patent No.: US 11,835,365 B2
(45) Date of Patent: Dec. 5, 2023

(54) CALIBRATION BRACKET

(71) Applicant: AUTEL INTELLIGENT TECHNOLOGY CORP., LTD., Guangdong (CN)

(72) Inventors: Lianjun Liu, Guangdong (CN); Biwang Lai, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 81 days.

(21) Appl. No.: 17/479,536

(22) Filed: Sep. 20, 2021

(65) Prior Publication Data
US 2022/0003578 A1 Jan. 6, 2022

Related U.S. Application Data

(63) Continuation of application No. PCT/CN2020/080420, filed on Mar. 20, 2020.

(30) Foreign Application Priority Data

Mar. 20, 2019 (CN) .......................... 201910214384.X
May 7, 2019 (CN) .......................... 201910375451.6

(51) Int. Cl.
*G01D 11/30* (2006.01)
*F16M 11/18* (2006.01)
(Continued)

(52) U.S. Cl.
CPC .............. *G01D 11/30* (2013.01); *F16M 11/18* (2013.01); *G01B 5/0002* (2013.01);
(Continued)

(58) Field of Classification Search
CPC ........ G01D 11/30; G01D 18/00; F16M 11/18; F16M 2200/028
(Continued)

(56) References Cited

U.S. PATENT DOCUMENTS 4,158,450 A * 6/1979 Suzuki .................... G11B 33/02
6,090,016 A * 7/2000 Kuo ....................... A63B 22/02
                                                              482/54
(Continued)

FOREIGN PATENT DOCUMENTS

CN         102109748 A      6/2011
CN         202769205 U      3/2013
(Continued)

OTHER PUBLICATIONS

Search report in first office Action of CN application No.2019103754516.
(Continued)

*Primary Examiner* — Stephanie E Bloss
*Assistant Examiner* — Kevin C Butler

(57) ABSTRACT

Embodiments of the disclosure discloses a calibration bracket. The calibration bracket includes a base, a vertical rod, a transverse force application member and a transverse force application mating member. The vertical rod is detachably mounted to the base. The transverse force application member is disposed on one of the base and the vertical rod. The transverse force application mating member is disposed on the other of the base and the vertical rod and is configured to be connected to the transverse force application member to apply, to the vertical rod, a force parallel to the base. A limiting protrusion is provided on one of the base and the vertical rod. A limiting opening is provided on the other of the base and the vertical rod. The limiting opening can allow the limiting protrusion to pass through the limiting opening and snugly abut against the limiting protrusion when the transverse force application member applies a transverse force to the vertical rod. By means of the structure described above, the vertical rod can be quickly mounted to or
(Continued)

detached from the base. Therefore, the calibration bracket is easy to assemble and transport.

20 Claims, 13 Drawing Sheets

(51) Int. Cl.
*G01D 18/00* (2006.01)
*G01B 5/00* (2006.01)
*G01N 29/265* (2006.01)
*G01D 11/24* (2006.01)
*G21C 17/017* (2006.01)

(52) U.S. Cl.
CPC ........... *G01D 11/245* (2013.01); *G01D 18/00* (2013.01); *G01N 29/265* (2013.01); *G21C 17/017* (2013.01); *F16M 2200/028* (2013.01)

(58) Field of Classification Search
USPC ....................................................... 73/866.5
See application file for complete search history.

(56) References Cited

U.S. PATENT DOCUMENTS

| | | | | |
|---|---|---|---|---|
| 6,394,403 | B1* | 5/2002 | Hung | F16M 13/022 |
| | | | | 248/278.1 |
| 6,604,722 | B1* | 8/2003 | Tan | F16M 13/02 |
| | | | | 254/122 |
| 7,644,473 | B2* | 1/2010 | Chen | G06F 1/1601 |
| | | | | 16/340 |
| 7,810,773 | B2* | 10/2010 | Chi | F16M 11/24 |
| | | | | 248/920 |
| 9,228,693 | B2* | 1/2016 | Ditges | F16M 11/24 |
| 9,717,974 | B2* | 8/2017 | Hahn | A63B 71/023 |
| 10,921,426 | B2* | 2/2021 | Tang | G01S 7/40 |
| 11,073,236 | B2* | 7/2021 | Chen | F16M 11/046 |
| 11,500,079 | B2* | 11/2022 | Lai | G01S 17/931 |
| 2003/0189306 | A1* | 10/2003 | Chen | A61G 5/12 |
| | | | | 280/250.1 |
| 2006/0187625 | A1* | 8/2006 | Jung | G06F 1/1601 |
| | | | | 361/679.05 |
| 2007/0262224 | A1* | 11/2007 | Cheng | F16M 11/2021 |
| | | | | 248/423 |
| 2012/0174912 | A1 | 7/2012 | Ceron García et al. | |
| 2012/0175321 | A1 | 7/2012 | Ditges et al. | |
| 2016/0123522 | A1 | 5/2016 | Hahn et al. | |
| 2019/0032841 | A1 | 1/2019 | Becker et al. | |
| 2020/0400782 | A1* | 12/2020 | Tang | G01S 7/4017 |
| 2021/0373121 | A1* | 12/2021 | Lai | F16M 11/42 |
| 2021/0381638 | A1* | 12/2021 | Lai | F16M 11/08 |
| 2022/0003578 | A1* | 1/2022 | Liu | F16M 11/041 |
| 2022/0107049 | A1* | 4/2022 | Liu | F16B 7/048 |

FOREIGN PATENT DOCUMENTS

| | | | |
|---|---|---|---|
| CN | 103162068 A | 6/2013 | |
| CN | 103438336 A | 12/2013 | |
| CN | 203431377 U | 2/2014 | |
| CN | 105650603 A | 6/2016 | |
| CN | 106051408 A | 10/2016 | |
| CN | 107649817 A | 2/2018 | |
| CN | 207232385 U | 4/2018 | |
| CN | 207316417 U | 5/2018 | |
| CN | 207355868 U | 5/2018 | |
| CN | 108593705 A | 9/2018 | |
| CN | 207807485 U | 9/2018 | |
| CN | 208221974 U | 12/2018 | |
| CN | 208304833 U | 1/2019 | |
| CN | 109481900 A | 3/2019 | |
| CN | 208606802 U | 3/2019 | |
| CN | 305366161 S | 9/2019 | |
| CN | 209524943 U | 10/2019 | |
| CN | 210514607 U | 5/2020 | |
| WO | WO 99/58032 | 11/1999 | |
| WO | WO-9958032 A1 * | 11/1999 | ............. F16M 11/14 |
| WO | WO-2019076247 A1 * | 4/2019 | ............ B60W 30/12 |
| WO | WO-2019076248 A1 * | 4/2019 | ................ B60S 5/00 |
| WO | WO-2019128842 A1 * | 7/2019 | ........... G01S 13/865 |
| WO | WO-2019137351 A1 * | 7/2019 | ............. F16M 11/04 |
| WO | WO-2019170100 A1 * | 9/2019 | ........... G01S 13/931 |
| WO | WO-2020143573 A1 * | 7/2020 | |
| WO | WO-2020259499 A1 * | 12/2020 | ............. F16B 2/005 |
| WO | WO-2021190359 A1 * | 9/2021 | ............. F16M 11/18 |
| WO | WO-2021190361 A1 * | 9/2021 | ............. F16M 11/04 |
| WO | WO-2021190362 A1 * | 9/2021 | ............. F16M 11/04 |

OTHER PUBLICATIONS

Title: AutoCAD Mechanical Drawing Detailed typical case; by Li Jie Chen, (Author) Pub Date: Feb. 2011.
The Extended European Search Report dated Aug. 23, 2021; Application. No. 20748693.7.
The International Search Regort dated Jun. 28, 2020; PCT/CN2020/080420.

* cited by examiner

CALIBRATION BRACKET

CROSS-REFERENCE

The present application claims priority to PCT Application No. PCT/CN2020/080420 filed on Mar. 20, 2020, which claims priority to Chinese Patent Application No. 201910214384.X, filed with China National Intellectual Property Administration on Mar. 20, 2019 and entitled "CALIBRATION BRACKET" and Chinese Patent Application No. 201910375451.6, filed with China National Intellectual Property Administration on May 7, 2019 and entitled "CALIBRATION BRACKET", which are incorporated herein by reference in their entireties.

BACKGROUND

Technical Field

The present application relates to the field of automobile correction, and in particular, to a calibration bracket.

Related Art

After customers purchase a correction device, some assembling work usually needs to be done. A more common method on the market is a method of locking screws. Under normal conditions, the device is not frequently moved after being assembled, but some customers need frequent transportation. If the device is not disassembled for carrying, the device is heavy and takes up a lot of space, which is not convenient for transportation. If frequently removed and locked, the screws are easy to fail, and the process of mounting and removal is more troublesome. Therefore, a calibration bracket that can be easily removed and ensure the stability of the device is required.

SUMMARY

In order to overcome the shortcomings of the prior art, embodiments of the disclosure provide a calibration bracket, which can implement functions of rapid disassembly and mounting.

The embodiments of the disclosure adopt the following technical solution to resolve the technical problem.

a calibration bracket, including:
a base;
a vertical rod detachably mounted to the base;
a transverse force application member disposed on one of the base and the vertical rod; and
a transverse force application mating member disposed on the other of the base and the vertical rod, the transverse force application mating member being configured to be mated with the transverse force application member to apply, to the vertical rod, a transverse force parallel to the base.

A limiting protrusion is provided on one of the base and the vertical rod. A limiting opening is provided on the other of the base and the vertical rod. The limiting opening allows the limiting protrusion to pass through the limiting opening and snugly abuts against the limiting protrusion when the transverse force application member applies the transverse force to the vertical rod.

In some embodiments, the limiting opening is a through hole composed of a larger hole and a smaller hole that are in communication with each other, and the limiting protrusion is snapped to the smaller hole after passing through the larger hole.

In some embodiments, the limiting opening is a U-shaped slot.

In some embodiments, the limiting protrusion has a cap-shaped end configured to prevent separation of the vertical rod from the base in a direction perpendicular to the base when the limiting protrusion snugly abuts against the limiting opening.

In some embodiments, the cap-shaped end includes a first abutting face, and the limiting opening includes a second abutting face, the first abutting face being mated with the second abutting face, and
when the transverse force application member applies the transverse force to the vertical rod, the first abutting face snugly abutting against the second abutting face, so that the vertical rod is snugly pressed against the base.

In some embodiments, the transverse force application member includes a pull handle and a clasp member,
the pull handle being pivotally connected to the base and being rotatable about a pivot joint,
one end of the clasp member being connected to the pull handle and being rotatable with the pull handle, and
rotating the pull handle causing an other end of the clasp member to be snugly clasped to or be detached from the transverse force application mating member.

In some embodiments, the pull handle has an adjustment hole. The clasp member passes through the adjustment hole, is movable along the adjustment hole and is fixed to a preset position.

In some embodiments, the transverse force application mating member includes a barb portion fixedly connected to the vertical rod. The clasp member is snugly clasped to the barb portion. The base is fixedly connected to the vertical rod.

In some embodiments, the transverse force application member includes a pull handle, a link and a push shaft,
the pull handle being pivotally connected to the base and being rotatable about a pivot joint,
the push shaft being slidably mounted in a guide hole provided on the base,
two ends of the link being respectively pivotally connected to the pull handle and the push shaft, and
rotating the pull handle causing the push shaft to slide along the guide hole, so as to abut against or be detached from the transverse force application mating member.

In some embodiments, the transverse force application mating member includes a flange. The push shaft abuts against the flange. The base is fixedly connected to the vertical rod.

In some embodiments, the vertical rod includes a pedestal. The transverse force application mating member is a perforated structure disposed on the pedestal or the base. The perforated structure includes an inclined face. The transverse force application member is snugly snapped to the inclined face of the transverse force application mating member. The base is fixedly connected to the vertical rod.

According to another aspect, a calibration bracket is provided, including:
a base;
a vertical rod detachably mounted to the base; and
a transverse force application member disposed on one of the base and the vertical rod, the transverse force application member being configured to be mated with the vertical rod to apply, to the vertical rod, a transverse force parallel to the base.

A limiting protrusion is provided on one of the base and the vertical rod. A limiting opening is provided on the other of the base and the vertical rod. The limiting opening allows the limiting protrusion to pass through the limiting opening and snugly abuts against the limiting protrusion when the transverse force application member applies the transverse force to the vertical rod.

According to another aspect, a calibration bracket is provided, including:
 a base;
 a vertical rod detachably mounted to the base, the vertical rod including a pedestal;
 at least two transverse force application members disposed on one of the base and the vertical rod; and
 at least two transverse force application mating members disposed on the other of the base and the vertical rod, each of the transverse force application mating members being configured to be connected to a corresponding one of the transverse force application members to apply, to the vertical rod, a transverse force parallel to the base.

All transverse forces applied to the vertical rod are combined into a pair of balance forces on a plane parallel to the base. The pedestal extends at least in opposite directions perpendicular to the pair of balance forces.

According to another aspect, a calibration bracket is provided, including:
 a base;
 a vertical rod detachably mounted to the base;
 at least three transverse force application members disposed on one of the base and the vertical rod; and
 at least three transverse force application mating members disposed on the other of the base and the vertical rod, each of the transverse force application mating members being configured to be connected to a corresponding one of the transverse force application members to apply, to the vertical rod, a transverse force parallel to the base, so that the vertical rod is fixed to the base.

All acting forces applied to the vertical rod are combined into a first pair of balance forces and a second pair of balance forces. The first pair of balance forces are perpendicular to the second pair of balance forces.

Compared with the prior art, the calibration bracket provided in the embodiments of the disclosure includes a transverse force application member and a transverse force application mating member. The transverse force application member is disposed on one of the base and the vertical rod. The transverse force application mating member is disposed on the other of the base and the vertical rod and is configured to be connected to the transverse force application member. The transverse force application mating member applies, to the vertical rod, a force parallel to the base. A limiting protrusion is provided on one of the base and the vertical rod. A limiting opening is provided on the other of the base and the vertical rod. The limiting opening can allow the limiting protrusion to pass through the limiting opening and snugly abut against the limiting protrusion when the transverse force application member applies a transverse force to the vertical rod. The vertical rod is fixed to the base. The transverse force application member can also be detached from the transverse force application mating member. This causes the vertical rod to be detached from the base. The connection between the vertical rod and the base by using the transverse force application member and the transverse force application mating member and the mating of the limiting protrusion and the limiting opening cause the vertical rod to be quickly mounted to or be detached the base. Therefore, the calibration bracket is easy to assemble and transport.

BRIEF DESCRIPTION OF THE DRAWINGS

One or more embodiments are exemplarily described with reference to the corresponding figures in the accompanying drawings. The descriptions are not to be construed as limiting the embodiments. Elements in the accompanying drawings that have same reference numerals are represented as similar elements. Unless otherwise particularly stated, the figures in the accompanying drawings are not drawn to scale.

DETAILED DESCRIPTION

For ease of understanding the disclosure, the disclosure is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right", "inner", "outside", and similar expressions used in this specification are merely used for an illustrative purpose.

Unless otherwise defined, meanings of all of the technical and scientific terms used in this specification are the same as those usually understood by those skilled in the art of the disclosure. The terms used in the specification of the disclosure are merely intended to describe objectives of the specific embodiment, and are not intended to limit the disclosure. The term "and/or" used in this specification includes any or all combinations of one or more related listed items.

To make the objectives, technical solutions, and advantages of the disclosure clearer and more comprehensible, the following further describes the disclosure in detail with reference to the accompanying drawings and embodiments. It should be understood that the specific embodiments described herein are merely used to explain the disclosure but are not intended to limit the disclosure.

Figure 1:
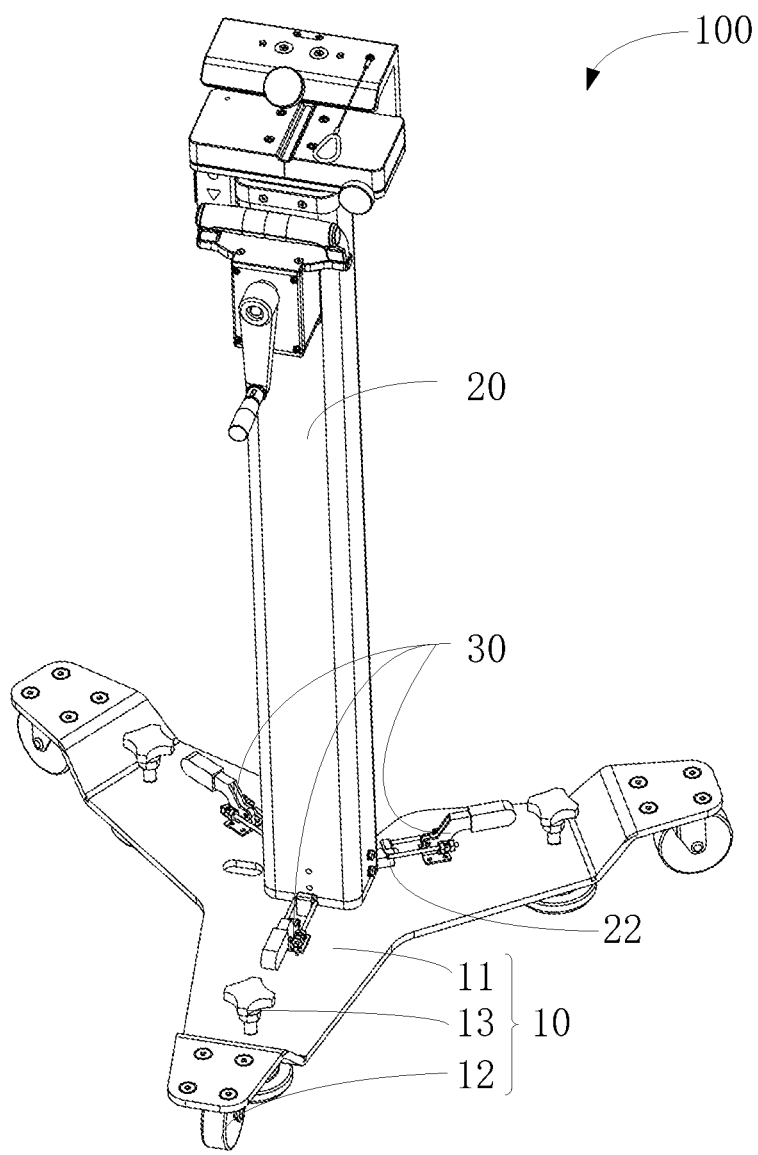
FIG. 1 is a schematic structural diagram of a calibration bracket according to an embodiment of the disclosure.

Referring to FIG. 1, a calibration bracket 100 provided in an embodiment of the disclosure includes a base 10, a vertical rod 20, a transverse force application member 30 and a transverse force application mating member 22. The vertical rod 20 is detachably mounted to the base 10 through a limiting component. The limiting component includes a transverse force application member 30 and a transverse force application mating member 22. The transverse force application member 30 is disposed on one of the base 10 and the vertical rod 20. The transverse force application mating member 22 is disposed on the other of the base 10 and the vertical rod 20. The transverse force application mating member 22 is configured to be connected to the transverse force application member 30 to apply, to the vertical rod 20, a force parallel to the base. When the transverse force application member 30 applies a constraint force to the vertical rod 20, the transverse force application member 30 can resolve at least a transverse pull force on a plane parallel to the base 10. At least two of the transverse force application members 30 respectively mate with a corresponding one of the transverse force application mating members 22. The vertical rod 20 can be fastened to the base 10 under the constraints of different transverse pull forces.

The application of "a transverse force" as used in this specification means that at least one transverse component force can be generated between the vertical rod and the base through the mating of the corresponding transverse force application member and the transverse force application mating member. In other words, an acting force actually applied by the transverse force application member to the vertical rod may be set at an oblique angle to the base, as long as the acting force can resolve the transverse force on a plane parallel to the base. The transverse force may be a pull force or a push force. For example, in FIG. 12 described later, although an application direction of the transverse force application member 30d itself is vertically downward, since the transverse force application mating member 22c includes an inclined face, a "transverse force" may also be generated between the vertical rod and the base. A mechanism that can generate the above "transverse force" is referred to as a "transverse force application member".

The calibration bracket 100 may be configured to hang a calibration element, for example, a multi-line laser emitter, a calibration target, a radar reflection or absorption device, and the like, to calibrate various vehicle-mounted sensors such as a front vehicle camera, an anti-collision radar, or the like.

The base 10 includes a base body 11, a roller 12 and a height adjustment member 13.

The base body 11 is triangular claw-shaped and includes three claws extending in three different directions. The vertical rod 20 is detachably connected to the base body 11.

The roller 12 is mounted to the bottom surface of the base body 11. There are three rollers 12. Each of the rollers 12 is mounted to a tail end of a corresponding one of the claws to facilitate movement of the base body 11. In this embodiment, the roller 12 is a universal moving roller, so that the base body 11 can move in any direction.

The height adjustment member 13 is mounted to the base body 11 for adjusting the height of the base body 10. In this embodiment, the height adjustment member 13 is an adjustment knob. There are three height adjustment members. There is at least one screw rod under the knob. The screw rod is in screw-thread fit with a through hole at the base body 11 to implement height adjustment of the base body 10 by rotating the knob. Each of the height adjustment members 13 is mounted to a corresponding one of the claws and is close to a corresponding one of the rollers 12. The three height adjustment members 13 are distributed in a regular triangle.

It may be understood that, in some other embodiments, the shape of the base body 11 may be changed according to actual needs, and is not limited to being triangular claw-shaped. For example, when the calibration bracket 100 is used to calibrate the radar, the base body 11 preferably uses a rectangular or rectangular-like structure. Two sides of the base body 11 respectively extend in their length directions to balance the force acting on the base 10 when a heavier radar calibration member is hung on the calibration bracket 100, to prevent the base 10 from causing the calibration bracket 100 to fall due to the uneven force. A size of the base 10 may be changed according to actual needs. Since the vertical rod 20 is detachably mounted to the base 10, and the vertical rod 20 and the base 10 may also be conveniently put into a vehicle after disassembly, the base 10 may be a structure with a larger size to adapt to the calibration element with a larger size. Quantities of the rollers 12 and the height adjustment members 13 may be increased or decreased according to actual needs. For example, the triangular-claw-shaped base body 11 may be provided with two height adjustment members 13 and mated with a foot with a fixed height to adjust an angle of the base body 11.

The vertical rod 20 is used to connect the calibration element to implement the function of the calibration bracket 100 calibrating the vehicle-mounted sensor. The vertical rod 20 is a square tube. On the one hand, an overall weight of the calibration bracket 100 can be reduced. On the other hand, the vertical rod 20 may include a fixed vertical rod and a movable vertical rod. The fixed vertical rod is detachably mounted to the base 10. The movable vertical rod is movably mounted to the fixed vertical rod. The movable vertical rod is movable relative to the fixed vertical rod in a length direction of the fixed vertical rod and is fixed at a certain position. The vertical rod 20 can adjust its own length as required to meet different calibration requirements. The movable vertical rod serves as an inner rod and may be disposed in the fixed vertical rod. Alternatively, the movable vertical rod serves as an outer rod and is sleeved on the fixed vertical rod. The movable vertical rod is sleeved on and connected to the fixed vertical rod. In this way, the height of the vertical rod 20 can be reduced to nearly half of the original height to facilitate transportation.

It may be understood that, in some other embodiments, a beam assembly with functions of unfolding and folding may be provided on the vertical rod 20. When the beam assembly is unfolded on the vertical rod 20, the calibration element may be hung on the beam assembly. When the beam assembly is folded on the vertical rod 20, the volume of the calibration bracket 100 can be reduced to facilitate transportation.

It may be understood that the vertical rod 20 is not limited to a square tube. The vertical rod 20 may also be a tube of other shapes, for example, a round tube, an elliptical or special-shaped tube, and the like.

The transverse force application member 30 may be connected to the transverse force application mating member 22 to apply, to the vertical rod 20, a transverse pull force parallel to the base to prevent the movement of the vertical rod 20 relative to the base 10. That is to say, the vertical rod 20 is fixed to the base 10.

Figure 12:
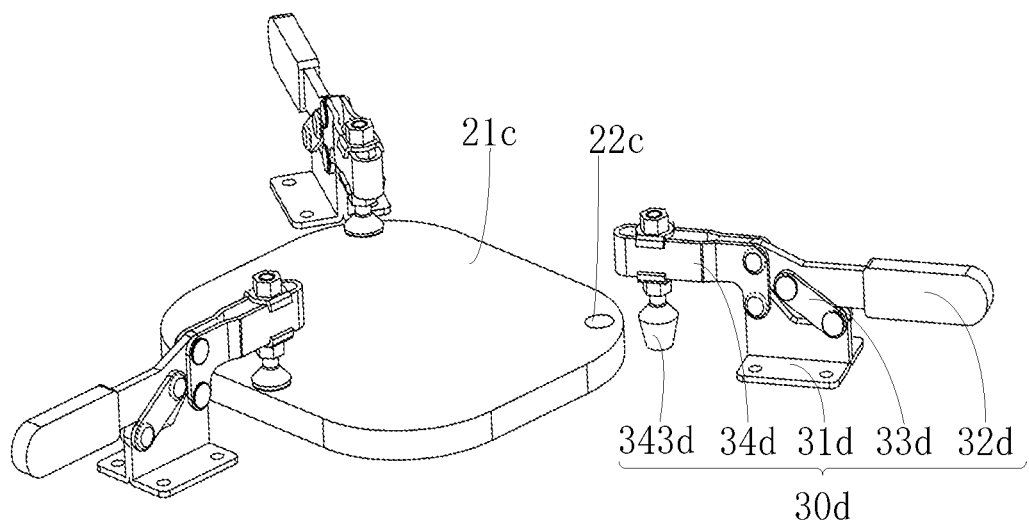
FIG. 12 is a schematic structural diagram of another calibration bracket according to some embodiments of the disclosure, where the upper part of the base and the vertical rod is omitted.

The transverse force application member 30 and the transverse force application mating member 22 may also adopt the structure shown in FIG. 12. For details, reference may be made to the following embodiments.

It may be understood that the quantity of limiting components may be selected according to actual needs. One transverse force application member 30 is correspondingly connected to one transverse force application mating member 22, as long as all transverse forces applied by all transverse force application members 30 to the vertical rod 20 can cause the vertical rod 20 to be subjected to a balance force and to be fastened to the base body 11. In other words, all of the transverse forces act together to prevent the movement of the vertical rod 20 relative to the base body 11. The vertical rod 20 is fixedly mounted to the base 10.

It may be understood that even when a certain amount of external force is applied to the vertical rod 20, the vertical rod 20 can still be fastened to the base 10 through connection to the limiting component. For example, when the calibration element is hung on the vertical rod 20, the center of gravity of the calibration element and the geometric contour center of a support face of the vertical rod 20 standing on the base 10 do not overlap. Therefore, the vertical rod 20 may be caused to have a tendency to fall towards a certain direction relative to the base 10. At this point, the corresponding transverse force application member 30 is fixed with relative positions of the base 10 and the vertical rod 20. The transverse force application member 30 can increase its acting force to the vertical rod 20 in an opposite direction. The acting force is applied to balance the force applied to the vertical rod 20, so that the vertical rod 20 stands firmly on the base 10. It may be understood that the vertical rod 20 can move relative to the base 10 only when the external force exceeds the load of the limiting component to such an extent that the structure of the limiting component is destroyed and the connection between the vertical rod 20 and the base 10 is cut off. Each of the transverse forces applied to the vertical rod 20 may be removed. That is to say, the transverse force application member 30 is detached from the transverse force application mating member 22. That is to say, the connection to the limiting component between the vertical rod 20 and the base 10 is cut off to detach the vertical rod 20 from the base 10.

Figure 2:
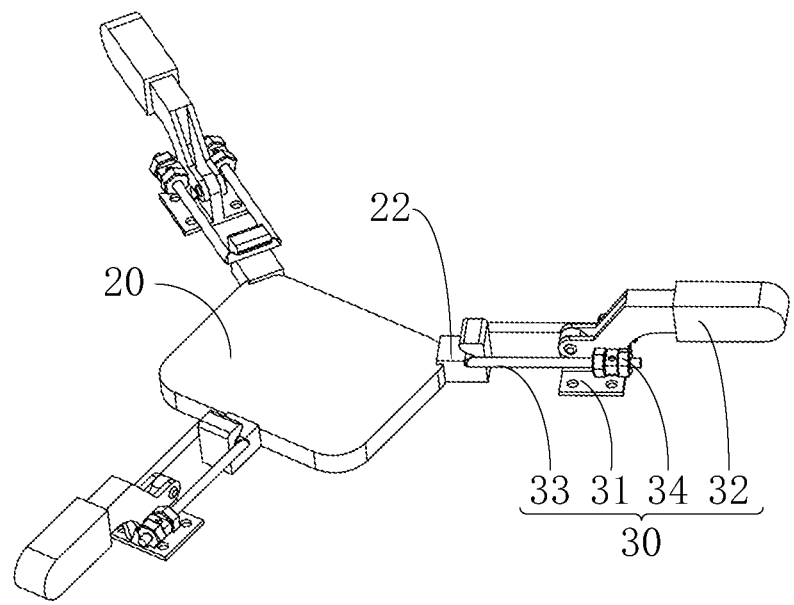
FIG. 2 is a schematic structural diagram of FIG. 1 omitting an upper part of a base and a vertical rod.
Figure 3:
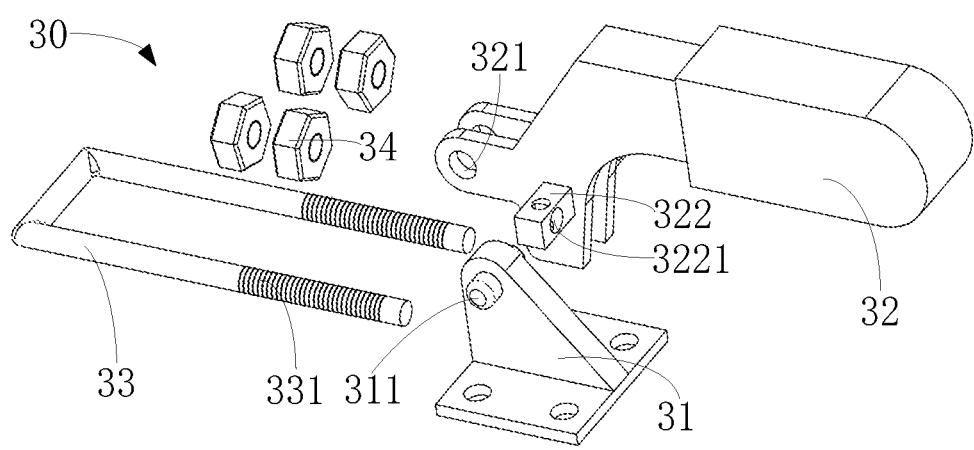
FIG. 3 is a structural exploded view of a transverse force application member of FIG. 1.

Referring to FIG. 2 and FIG. 3 together, in this embodiment, the limiting component is a latch structure. The limiting component connects the vertical rod 20 to the base 10 by using a buckle. The limiting component includes a transverse force application member 30 and a transverse force application mating member 22.

In this embodiment, the quantity of limiting components is three. The three limiting components are regularly distributed with the vertical rod 20 as the center. Since the vertical rod 20 is a square tube, preferably, the two limiting components are respectively disposed at two adjacent corners of the bottom of the vertical rod 20, and are respectively located on extension lines of two diagonals of the bottom of the vertical rod 20. The other limiting component is disposed on the opposite side of the two adjacent corners, and is perpendicular to the side line and located at a midpoint position of the side line. The three limiting components are distributed in an isosceles triangle.

Three transverse force application members 30 are respectively disposed on the base 10. The three transverse force application mating member 22 are respectively disposed on a bottom of the vertical rod 20. One of the transverse force application mating members 22 corresponds to one of the transverse force application members 30.

Each of the transverse force application members 30 is fixedly mounted to the base body 11. Each of the transverse force application members 30 is snugly clasped to a corresponding one of the transverse force application mating members 22. Each of the limiting components is fixed with relative positions of the vertical rod 20 and the base 10. Each of the transverse force application members 30 applies a transverse force to the vertical rod 20. The three pull forces cause the vertical rod 20 to be subjected to a balance force and to be fastened to the base body 11. The three transverse forces are all arranged in parallel with the base body 11. The vertical rod 20 is subjected to a balance force in a direction parallel to the base body 11. When the vertical rod 20 is subjected to an external force and has a tendency to move in a certain direction relative to the base body 11, the corresponding one or two of the transverse force application members 30 will increase the transverse force opposite to the direction, to balance the external force applied to the vertical rod 20. The vertical rod 20 remains stationary relative to the base body 11.

It may be understood that the acting force applied by the transverse force application member 30 to the vertical rod 20 may actually be arranged at an oblique angle to the base body 11. For example, the transverse force application member 30 applies an oblique downward acting force to the vertical rod 20. The acting force is parallel to the transverse force of the base body 11 for preventing movement of the vertical rod 20 in a direction parallel to the base body 11. The vertical rod 20 is stationary relative to the base body 11. The acting force is perpendicular to the component force of the base body 11 for causing the bottom of the vertical rod 20 to press against the base body 11.

The transverse force application mating member 22 includes a barb portion. The barb portion is hook-shaped. The transverse force application mating member 22 is fixedly connected to the bottom of the vertical rod 20. The transverse force application member 30 is snugly clasped to the transverse force application mating member 22 to apply a transverse force to the vertical rod 20. The base 10 is fixedly connected to the vertical rod 20. Preferably, a bent part of the transverse force application mating member 22 is disposed upward away from the base body 11, to facilitate clasping of the transverse force application member 30 to the barb portion of the transverse force application mating member 22. A bottom of the transverse force application mating member 22 abuts against the base body 11. The vertical rod 20 is not easy to tilt relative to the base body 11.

The transverse force application member 30 includes a pivot seat 31, a pull handle 32, a clasp member 33 and a fixing member 34.

The pivot seat 31 is fixedly mounted to the base body 11 and is disposed opposite to a corresponding one of the transverse force application mating members 22. A pivot shaft 311 is provided on the pivot seat 31.

A pivot hole 321 is formed on the pull handle 32. The pivot hole 321 of the pull handle 32 is pivotally connected to the pivot shaft 311. The pull handle 32 is rotatable relative to the pivot seat 31 around the pivot shaft 311. An adjustment block 322 is provided on each of two sides of the pull handle 32. The adjustment blocks 322 are fixedly connected to the pull handle 32. An adjustment hole 3221 is formed on the adjustment block 322. The adjustment hole 3221 can change its position relative to the pivot hole 321 as the pull handle 32 rotates.

It may be understood that, the pivot seat 31 may be omitted according to the actual situation. The pull handle 32 may be directly pivotally connected to the base body 11.

The clasp member 33 is a structure in the shape of a Chinese character "⊏". An open loop end of the clasp member is mounted to the pull handle 32 and is rotatable with the pull handle 32. A closed loop end of the clasp member is used to snugly clasp the barb portion of the transverse force application mating member 22. The transverse force application member 30 tightly connects the vertical rod 20 to the base 10. Threaded portions 331 are respectively provided on two sides of the open loop end of the clasp member 33. The two threaded portions 331 respectively pass through the adjustment holes 3221 on two sides of the pull handle 32 and can move relative to the adjustment block 322 along the adjustment hole 3221 to adjust a length of the clasp member 33 protruding from the transverse force application mating member 22.

Two fixing members 34 are respectively provided for each of the threaded portions 331. The two fixing members 34 are respectively located on two sides of one of the adjustment holes 3221 and threadedly mate with the threaded portion 331. Each of the fixing members 34 is rotatable and abuts against one side of the adjustment hole 3221. The clasp member 33 is fastened to the adjustment block 322. A corresponding one of the fixing members 34 is loosened to adjust the length of the clasp member 33 protruding from the transverse force application mating member 22, so as to change a tension force of the clasp member 33 when being snapped into the transverse force application mating member 22.

It may be understood that the clasp member 33 is not limited to the structure in the shape of a Chinese character "⊏". The clasp member 33 may also be other structures that is tightly connected to the transverse force application mating member 22, for example, an L-shaped structure, a T-shaped structure, a U-shaped structure or the like. The fixing member 34 may also be omitted. The clasp member 33 is a structure for a frame body to be fixedly connected to a screw rod. The frame body is used to be snapped into the transverse force application mating member 22. The screw rod is directly threadedly connected to the adjustment block 322, so that the length of the clasp member 33 protruding from the transverse force application mating member 22 is adjusted.

The clasp member 33 is rotatable relative to the pivot seat 31 with the pull handle 32 to change the position of the clasp member 33 relative to the transverse force application mating member 22. Rotating the pull handle 32 causes the closed loop end of the clasp member 33 to be snugly clasped to or detached from the transverse force application mating member 22. Specifically, after the vertical rod 20 is placed at a predetermined position, one of the clasp members 33 corresponds to one of the transverse force application mating members 22. Each of the pull handles 32 is rotated in a direction away from the vertical rod 20 around a corresponding one of the pivot shafts 311. Each of the clasp members 33 is snugly clasped to a corresponding one of the transverse force application mating members 22. The three clasp members 33 respectively apply transverse forces in different directions to the three transverse force application mating members 22 to prevent the movement of the vertical rod 20 relative to the base 10. The transverse forces are parallel to the base body 11. The vertical rod 20 is subjected to its own gravity. A bottom face of the vertical rod naturally abuts against the base body 11. The vertical rod 20 is fixed to the base body 11. At this point, a bottom of the pull handle 32 abuts against the pivot seat 31. The pivot seat 31 cannot continue to rotate about the pivot hole 321 in a direction away from the vertical rod 20. In addition, a vertical distance between the adjustment hole 3221 and the base body 11 is less than a vertical distance between the pivot hole 321 and the base body 11. The clasp member 33 and the transverse force application mating member 22 are locked. Even if the transverse force application mating member 22 applies a reacting force to the closed loop end of the clasp member 33, the open loop end of the clasp member 33 cannot be rotated about the pivot shaft 311 to detach the clasp member 33 from the transverse force application mating member 22.

The pull handle 32 can be rotated about the pivot shaft 311 in the direction of the vertical rod 20. The clasp member 33 rotates with the pull handle 32 to change a position of the clasp member relative to the transverse force application mating member 22. That is to say, the clasp member 33 is detached from the transverse force application mating member 22. The vertical rod 20 can be detached from the base 10.

In this embodiment, the clasp members 33 of the three transverse force application members 30 need to be respectively snugly clasped to the three transverse force application mating members 22 to fixedly mount the vertical rod 20 to the base 10. The clasp members 33 of the three transverse force application members 30 may be respectively detached from the three transverse force application mating members 22 to detach the vertical rod 20 from the base 10.

Figure 4:
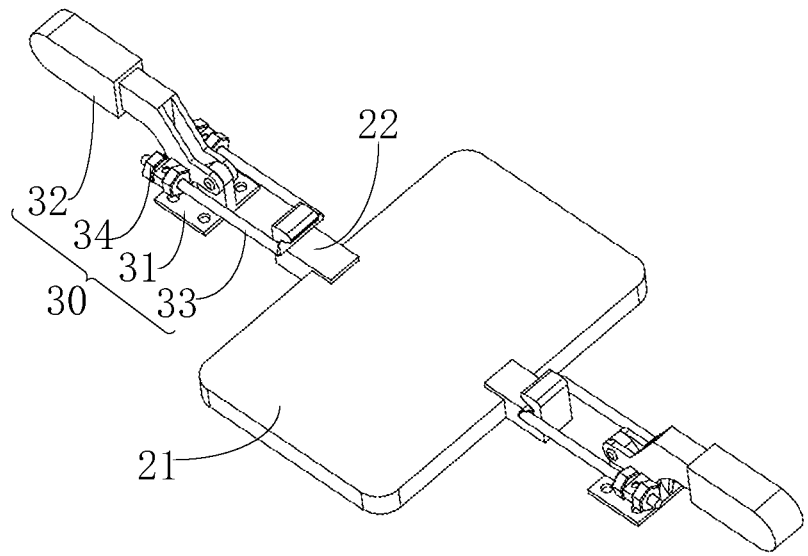
FIG. 4 is a schematic structural diagram of another calibration bracket according to some embodiments of the disclosure, where the upper part of the base and the vertical rod is omitted.

Referring to FIG. 4, in some other embodiments, the quantity of the limiting components is two. The two limiting components are symmetrically disposed on two sides of the vertical rod 20. The two limiting components are located on the same straight line.

Two transverse force application members 30 are respectively disposed on the base 10. The two transverse force application mating member 22 are respectively disposed on a bottom of the vertical rod. One of the transverse force application mating members 22 corresponds to one of the transverse force application members 30.

Each of the transverse force application members 30 is fixedly mounted to the base body. Each of the transverse force application mating members 22 is fixedly connected to the vertical rod. Each of the transverse force application members 30 is snugly clasped to the transverse force application mating member 22. Each of the limiting components is fixed with relative positions of the vertical rod 20 and the base 10. Each of the transverse force application members 30 applies a symmetrical transverse force to the vertical rod 20. The vertical rod 20 is subjected to a balance force and fastened to the base 10. The two transverse forces are a pair of balance force.

The transverse force application mating member 22 includes a barb portion. The barb portion is hook-shaped. The transverse force application mating member 22 is fixedly connected to the bottom of the vertical rod 20. The transverse force application member 30 is snugly clasped to the transverse force application mating member 22 to apply a pull force to the vertical rod 20. The base 10 is fixedly connected to the vertical rod 20.

The vertical rod 20 includes a pedestal 21. The pedestal 21 is located at the bottom of the vertical rod 20. The vertical rod 20 is integrally formed. The pedestal 21 may be substantially a rectangular flat plate. Two ends of the pedestal 21 extend to two sides of the vertical rod 20 without transverse force. In other words, the pedestal 21 extends at least in opposite directions perpendicular to the balance force to increase a contact area between the vertical rod 20 and the base body 11. The vertical rod 20 can stand firmly on the base 10 and is not easy to fall to the two sides without subjected to forces relative to the base 10, so as to prevent the vertical rod 20 from being subjected to an unbalanced force on the two sides without the limiting component.

In this embodiment, the clasp members 33 of the two transverse force application members 30 need to be respectively snugly clasped to the two transverse force application mating members 22 to fixedly mount the vertical rod 20 to the base 10. The clasp members 33 of the two transverse force application members 30 may be respectively detached from the two transverse force application mating members 22 to detach the vertical rod 20 from the base 10.

The transverse force application member 30 and the transverse force application mating member 22 may also adopt the structure shown in FIG. 12. For details, reference may be made to the following embodiments.

It may be understood that when the transverse force application member 30 is disposed on the vertical rod 20 and the transverse force application mating member 22 is disposed on the base 10, the transverse force application member 30 may be mounted to a specific position of the vertical rod 20 according to actual needs. For example, the transverse force application member 30 is mounted to the pedestal 21, or the pedestal 21 is mounted to a side wall of the vertical rod 20.

In some other embodiments, a limiting structure is provided between the vertical rod 20 and the base 10. The limiting structure includes a limiting protrusion 14 and a limiting opening 211*a*. The limiting protrusion 14 is provided on one of the base 10 and the vertical rod 20. The limiting opening 211*a* is provided on the other of the base 10 and the vertical rod 20. The limiting opening 211*a* can allow the limiting protrusion 14 to pass through the limiting opening 211*a* and snugly abut against the limiting protrusion 14 when the transverse force application member 30 applies the transverse force to the vertical rod 10. The vertical rod 20 is fixed to the base 10. The transverse force application member 30 may also be detached from the transverse force application mating member 22, so that the vertical rod 20 can be detached from the base 10.

Figure 5:
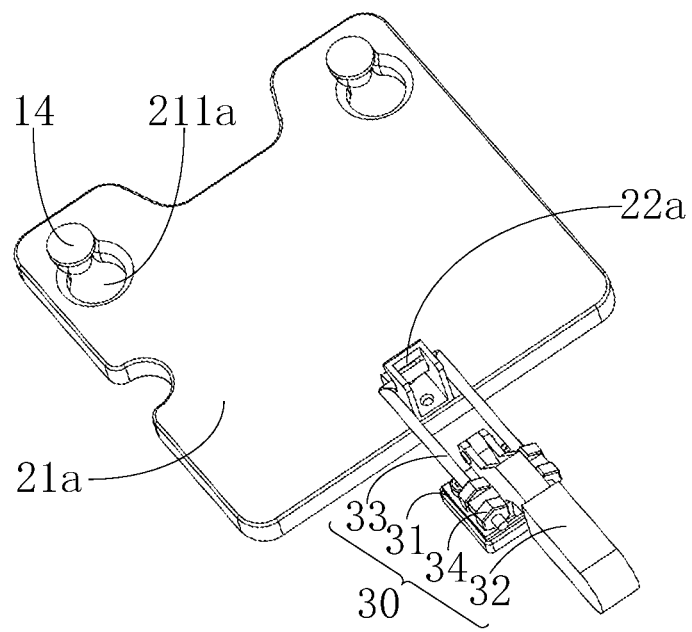
FIG. 5 is a schematic structural diagram of another calibration bracket according to some embodiments of the disclosure, where the upper part of the base and the vertical rod is omitted.
Figure 6:
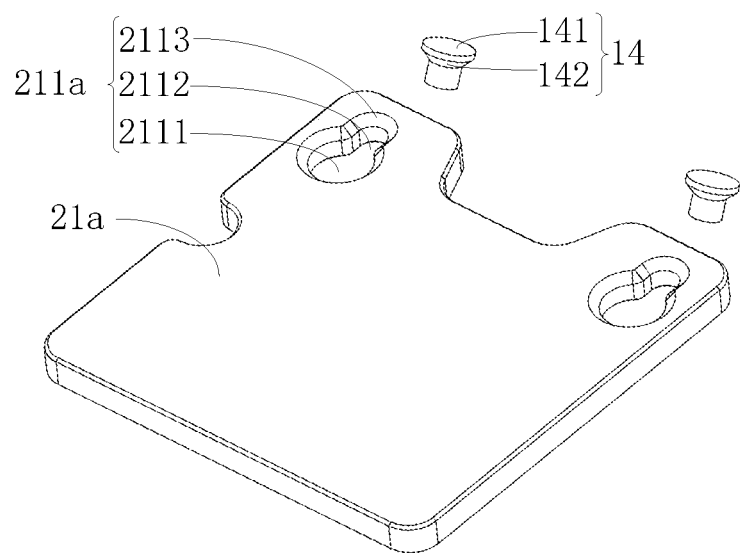
FIG. 6 is a schematic structural diagram of a pedestal and a limiting protrusion of FIG. 5.

Referring to FIG. 5 and FIG. 6, in some other embodiments, the quantity of the limiting components is one, and the limiting component is disposed on one side of the vertical rod 20. The limiting component includes a transverse force application member 30 and a transverse force application mating member 22*a*. The transverse force application member 30 is disposed on the base 10. The transverse force application mating member 22*a* is disposed on the vertical rod 20. The transverse force application member 30 is disposed opposite to the transverse force application mating member 22*a*.

The transverse force application member 30 is fixedly mounted to the base body 11. The transverse force application mating member 22*a* is fixedly connected to the vertical rod 20. The transverse force application member 30 is snugly clasped to the transverse force application mating member 22*a*. The limiting component is fixed with relative positions of the vertical rod 20 and the base 10. The transverse force application member 30 applies a transverse force to the vertical rod 20.

The vertical rod 20 includes a pedestal 21*a*. The pedestal 21*a* is located at the bottom of the vertical rod 20, and the vertical rod 20 is integrally formed. The pedestal 21*a* may be substantially a rectangular flat plate. The pedestal 21*a* extends around the vertical rod 20 to increase the contact area between the vertical rod 20 and the base body 11. The vertical rod 20 can stand firmly on the base body 11, thus preventing the vertical rod 20 from toppling when the calibration element is hung on the vertical rod.

The transverse force application mating member 22*a* is fixedly connected to the pedestal 21*a*. The transverse force application mating member 22*a* is disposed opposite to the transverse force application member 30. The transverse force application mating member 22*a* is configured to be snugly clasped to the clasp member 33 of the transverse force application member 30. A bent portion of the transverse force application mating member 22*a* is disposed upward away from the pedestal 21*a*.

A limiting protrusion 14 is provided on one of the base 10 and the vertical rod 20. A limiting opening 211*a* is provided on the other of the base 10 and the vertical rod 20. The limiting opening 211*a* allows the limiting protrusion 14 to pass through the limiting opening 211*a* and snugly abutting against the limiting protrusion 14 when the transverse force application member 30 applies the transverse force to the vertical rod 20. By disposing the limiting protrusion 14 and the limiting opening 211*a* that mate with each other, the quantity of limiting components required to fix the vertical rod 20 can be reduced correspondingly. Therefore, positioning between the vertical rod 20 and the base 10 can be facilitated, and the vertical rod 20 can be mounted and disassembled more quickly.

Further, the limiting opening 211*a* may be approximately perforated. The limiting protrusion 14 may be approximately rod-shaped. The limiting opening 211*a* is formed on the pedestal 21*a*. The limiting protrusion 14 is fixedly connected to the base 10.

In this embodiment, two of the limiting openings 211*a* are provided on one side of the pedestal 21*a*. Two of the limiting protrusions 14 are respectively provided corresponding to the two limiting openings 211*a* on the base body 11. One of the transverse force application mating members 22*a* is disposed on the opposite side of the two limiting openings 211*a* and at the top of the pedestal 21*a*. The two limiting openings 211a and the transverse force application mating member 22a are distributed in an isosceles triangle.

The limiting protrusion 14 can pass through the limiting opening 211a and then be snapped to the limiting opening 211a. When the clasp member 33 of the transverse force application member 30 snugly clasps the transverse force application mating member 22a, the transverse force applied by the transverse force application member 30 to the vertical rod 20 causes the limiting protrusion 14 to snugly abut against an inner side wall of the limiting opening 211a. That is, the mutual mating of the transverse force application member 30 and the limiting opening 211a as well as the limiting protrusion 14 can prevent the movement of the vertical rod 20 relative to the base 10. The vertical rod 20 is tightly fixed to the base 10.

Further, the limiting protrusion 14 has a cap-shaped end 141. The cap-shaped end 141 is fixedly connected to an end of the limiting protrusion 144. The cap-shaped end 141 is configured to abut against an edge of the limiting opening 211a. In other words, the cap-shaped end 141 abuts against an upper surface of the pedestal 21a and snugly presses the vertical rod 20 against the base 10 to prevent separation of the vertical rod 20 from the base 10 in a direction perpendicular to the base 10. When the clasp member 33 of the transverse force application member 30 snugly clasps the transverse force application mating member 22a, the limiting protrusion 14 simultaneously snugly abuts against the inner side wall of the limiting opening 211a and the upper surface of the pedestal 21a. The vertical rod 20 is fixed to the base 10.

Further, a first abutting face 142 is provided for the cap-shaped end 141. A second abutting face 2113 is provided for the edge of the limiting opening 211a. The first abutting face 142 is mated with the second abutting face 2113. The first abutting face 142 snugly abuts against the second abutting face 2113 to generate a force that presses the vertical rod 20 against the base 10 in a direction perpendicular to the base 10. The limiting opening 211a can be closely connected to the limiting protrusion 14. The vertical rod 20 is snugly pressed against the base 10 to prevent a gap from being formed between the cap-shaped end 141 of the limiting protrusion 14 and the edge of the limiting opening 211a. In this embodiment, the first abutting face 142 and the second abutting face 2113 are both inverted conical faces. The cap-shaped end 141 can be close to the edge of the limiting opening 211a. The limiting protrusion 14 can apply a pressure to an inclined face of the vertical rod 20, thus balancing the force of the vertical rod 20 from the angle of the inclined face.

In this embodiment, the limiting opening 211a is a through hole composed of a larger hole 2111 and a smaller hole 2112 that are in radial communication with each other. The smaller hole 2112 is disposed farther from the transverse force application mating member 22a than the larger hole 2111. An aperture of the larger hole 2111 is greater than an aperture of the smaller hole 2112. The cap-shaped end 141 is a round cap-shaped end. A diameter of the cap-shaped end 141 is less than or equal to the aperture of the larger hole 2111 and greater than the aperture of the smaller hole 2112. A diameter of a rod of the limiting protrusion 14 is mated with the aperture of the smaller hole 2112. The limiting protrusion 14 can be snapped to the smaller hole 2112 after passing through the larger hole 2111. The first abutting face 142 of the cap-shaped end 141 abuts against the second abutting face 2113 of the smaller hole 2112.

In this embodiment, the two limiting protrusions 14 are caused to pass through the two larger holes 2111 respectively and then be snapped to the smaller holes 2112. Then the clasp member 33 of the transverse force application member 30 is snugly clasped to the transverse force application mating member 22a to fixedly mount the vertical rod 20 to the base 10. The clasp member 33 of the transverse force application member 30 may be detached from the clasp portion. Then the two limiting protrusions 14 are respectively detached from the two limiting openings 211a to detach the vertical rod 20 from the base 10.

The transverse force application member 30 and the transverse force application mating member 22a may also adopt the structure shown in FIG. 12. For details, reference may be made to the following embodiments.

It may be understood that, in some other embodiments, the pedestal 21a may be omitted. The limiting protrusion 14 or the limiting opening 211a may be directly provided on the vertical rod 20. The vertical rod is mated with one of the limiting components to fasten the vertical rod 20 to the base 10.

Figure 7:
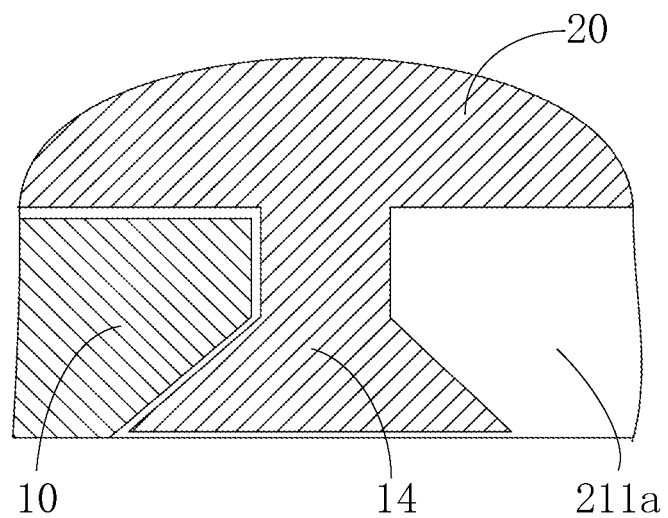
FIG. 7 is a schematic diagram of mating of a limiting protrusion and a limiting opening of another calibration bracket according to some embodiments of the disclosure.

Referring to FIG. 7, in some other embodiments, the limiting protrusion 14 is disposed on the vertical rod 20. The limiting opening 211a is formed on the base 10. The limiting opening 211a can allow the limiting protrusion 14 to pass through the limiting opening 211a and snugly abut against the limiting protrusion 14 when the transverse force application member 30 applies the transverse force to the vertical rod 20. The vertical rod 20 is fastened to the base 10.

It may be understood that, in some other embodiments, the transverse force application member 30 is fixedly mounted to the vertical rod 20. The transverse force application mating member is fixedly connected to the base body 11. One of the transverse force application members 30 corresponds to one of the transverse force application mating members 22a. Each of the transverse force application members 30 may be respectively snugly clasped to a corresponding one of the transverse force application mating members. The vertical rod 20 is fixed to the base body 11. Each of the transverse force application members 30 may also be detached from the corresponding one of the transverse force application mating members. The vertical rod 20 can be detached from the base body 11.

It may be understood that, the quantity of limiting protrusions 14 and limiting openings may be selected according to actual needs. The quantity of the transverse force application mating member 30 may also be selected according to actual needs. As long as the transverse force application member 30 snugly clasps the transverse force application mating member, all of the limiting openings 211a can be mated with the corresponding limiting protrusions 14. The vertical rod 20 is fastened to the base 10. For example, three limiting protrusions 14 and one transverse force application mating member are disposed at the bottom of the vertical rod 20. The limiting openings in a one-to-one correspondence with the three limiting protrusions 14 are disposed on the base 10. The three limiting openings and the transverse force application mating member are distributed in a prismatic shape.

Figure 8:
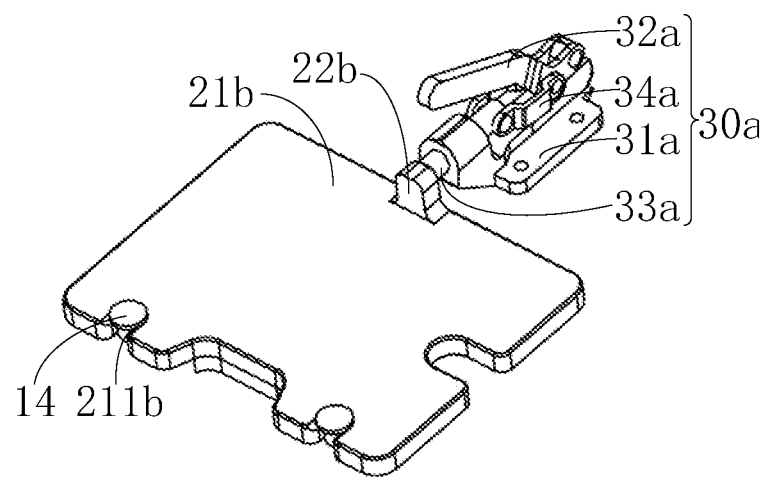
FIG. 8 is a schematic structural diagram of another calibration bracket according to some embodiments of the disclosure, where the upper part of the base and the vertical rod is omitted.

Referring to FIG. 8, in some other embodiments, the limiting component is a push-pull structure. The limiting component connects the vertical rod 20 to the base 10 upon abutting. The limiting component includes a transverse force application member 30a and a transverse force application mating member 22b. The transverse force application mating member 22b includes a flange. The transverse force application member 30a may abut against one side face of the flange.

The quantity of the limiting components is one. The limiting component is disposed on one side of the vertical rod 20. The transverse force application member 30*a* is disposed on the base 10. The transverse force application mating member 22*b* is disposed on the vertical rod 20. The transverse force application member 30 is disposed opposite to the transverse force application mating member 22*a*.

The transverse force application member 30*a* is fixedly mounted to the base body 11. The transverse force application mating member 22*b* is fixedly connected to the vertical rod 20. The transverse force application member 30*a* snugly abuts against the transverse force application mating member 22*b*. The limiting component is fixed with relative positions of the vertical rod 20 and the base 10. The transverse force application member 30*a* applies a transverse pull force to the vertical rod 20.

The vertical rod 20 includes a pedestal 21*b*. The pedestal 21*b* is located at the bottom of the vertical rod 20, and the vertical rod 20 is integrally formed.

The transverse force application mating member 22*b* is fixedly connected to a top of the pedestal 21*b* and is disposed opposite to the transverse force application member 30*a*.

Two limiting openings 211*b* are provided for the pedestal 21*b*. Two of the limiting protrusions 14 are correspondingly provided for the base body 11. One of the limiting openings 211*b* corresponds to one of the limiting protrusions 14. The two limiting openings 211*b* are located on opposite sides of the transverse force application mating member 22*b*. The two limiting openings 211*b* and the transverse force application mating member 22*b* are distributed in an isosceles triangle.

Figure 9:
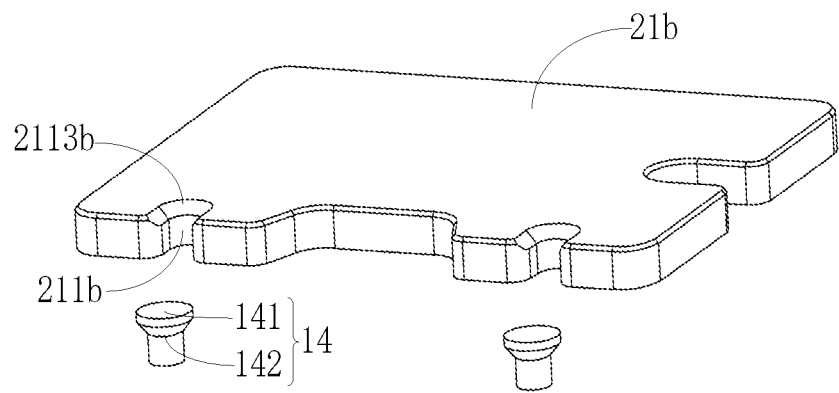
FIG. 9 is a schematic structural diagram of a pedestal and a limiting protrusion of FIG. 8.
Figure 10:
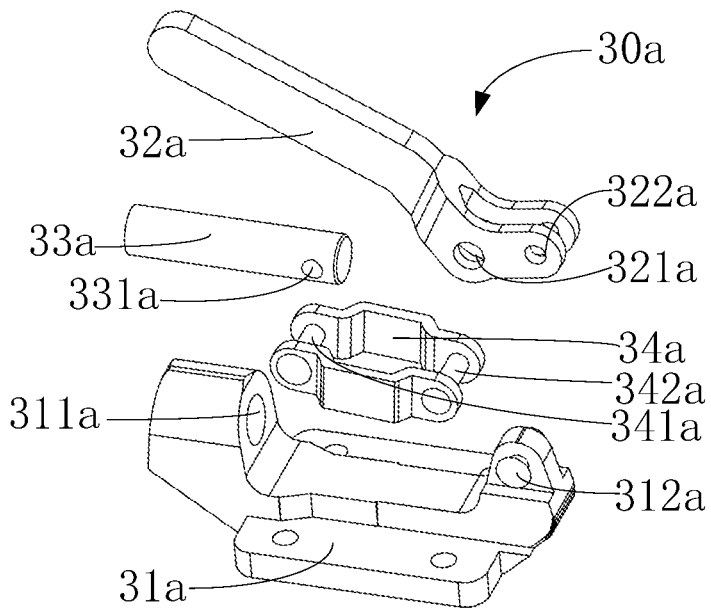
FIG. 10 is a structural exploded view of a transverse force application member of FIG. 8.

Referring to FIG. 8 and FIG. 9, in this embodiment, the limiting opening 211*b* is a U-shaped through slot. The slot of the limiting opening 211*b* is disposed away from the transverse force application mating member 22*b*. A cap-shaped end 141 is provided on the limiting protrusion 14. A first abutting face 142 is provided for the cap-shaped end 141. A second abutting face 2113*b* is provided for the edge of the limiting opening 211*b*. The first abutting face 142 is mated with the second abutting face 2113*b*. The first abutting face 142 snugly abuts against the second abutting face 2113*b*. The limiting opening 211*b* can be closely connected to the limiting protrusion 14. The vertical rod 20 is snugly pressed against the base 10. The first abutting face 142 and the second abutting face 2113*b* are both inverted conical faces. The cap-shaped end 141 can be snugly attached to the edge of the limiting opening 211*b*. The limiting protrusion 14 can apply a pressure to an inclined face of the vertical rod 20, thus balancing the force of the vertical rod 20 from the angle of the inclined face.

The transverse force application member 30*a* includes a pivot seat 31*a*, a pull handle 32*a*, a push shaft 33*a* and a link 34*a*.

The pivot seat 31*a* is fixedly mounted to the base body 11. A guide hole 311*a* is formed on a front end of the pivot seat 31*a*. The guide hole 311*a* is disposed opposite to the transverse force application mating member 22*b*. A pivot shaft 312*a* is provided on a rear end of the pivot seat 31*a*.

A first pivot hole 321*a* and a second pivot hole 322*a* are formed on the pull handle 32*a*. The first pivot hole 321*a* and the second pivot hole 322*a* are disposed front and rear. The second pivot hole 322*a* of the pull handle 32*a* is pivotally connected to the pivot shaft 312*a* and is rotatable about the pivot shaft 312*a* relative to the pivot seat 31*a*.

The push shaft 33*a* is slidably mounted to the guide hole 311*a* and can slide along the guide hole 311*a* relative to the pivot seat 31*a*. A third pivot hole 331*a* is formed at one end of the push shaft 33*a*. The third pivot hole 331*a* is disposed away from the transverse force application mating member 22*b*.

It may be understood that, according to actual needs, the pivot seat 31*a* may be omitted. The pull handle 32*a* may be directly pivotally connected to the base body 11. The guide hole 311*a* may be directly provided on the base body 11. The push shaft 33*a* is slidably mounted to the guide hole 311*a*.

A first rotating shaft 341*a* and a second rotating shaft 342*a* are respectively disposed at front and rear ends of the link 34*a*. The first rotating shaft 341*a* and the second rotating shaft 342*a* are respectively pivotally connected to the third pivot hole 331*a* of the push shaft 33*a* and the first pivot hole 321*a* of the pull handle 32*a*. Rotating the pull handle 32*a* causes the push shaft 33*a* to slide along the guide hole 311*a* within a certain stroke.

In this embodiment, after the two limiting protrusions 14 are snapped to the limiting openings 211*b*, the pull handle 32*a* is rotated about the pivot shaft 312*a* toward the vertical rod 20. The push shaft 33*a* slides toward the transverse force application mating member 22*b* along the guide hole 311*a*. Therefore, one end of the push shaft 33*a* is caused to abut against the transverse force application mating member 22*b* to fasten the vertical rod 20 to the base 10. In addition, a vertical distance between a pivot joint of the second rotating shaft 342*a* of the link 34*a* and the first pivot hole 321*a* of the pull handle 32*a* and the base body 11 is less than a vertical distance between a pivot joint of the first rotating shaft 341*a* of the link 34*a* and the third pivot hole 331*a* of the push shaft 33*a* and the base body 11. The push shaft 33*a* and the transverse force application mating member 22*b* are in a locked state. Even if the transverse force application mating member 22*b* applies a reverse push force to the push shaft 33*a*, the push shaft 33*a* cannot be detached from the transverse force application mating member 22*b*.

The pull handle 32*a* can be rotated about the pivot shaft 312*a* in a direction away from the vertical rod 20. The push shaft 33*a* is detached from the transverse force application mating member 22*b* along the guide hole 311*a*, thereby detaching the vertical rod 20 from the base 10.

It may be understood that, in some other embodiments, the transverse force application mating member 22*b* may be omitted. The transverse force application member 30*a* is configured to mate with the vertical rod 20. The transverse force application member 30 may directly abut against a side wall of the vertical rod 20.

It may be understood that, in some other embodiments, the pedestal 21*b* may be omitted. The limiting protrusion 14 or the limiting opening 211*b* may be directly disposed on the vertical rod 20. The vertical rod is mated with one limiting component to fasten the vertical rod 20 to the base 10. The quantity of the transverse force application members 30*a* may also be selected according to actual needs. For example, four transverse force application members 30*a* are regularly disposed around the vertical rod 20. In order to cause the push shaft 33*a* of the transverse force application member 30*a* to be tightly mated with the vertical rod 20, insertion holes disposed in a one-to-one correspondence with the four push shafts 33*a* may be disposed on the vertical rod 20. The insertion holes are blind holes. In other words, the transverse force application mating member 22*b* may be the insertion hole. When the push shaft 33*a* abuts against the vertical rod 20, the push shaft 33*a* is at least partially received in the insertion hole, and the vertical rod 20 is fastened to the base 10. At this point, the limiting opening 211*b* and the limiting protrusion 14 may also be omitted accordingly as required.

Figure 11:
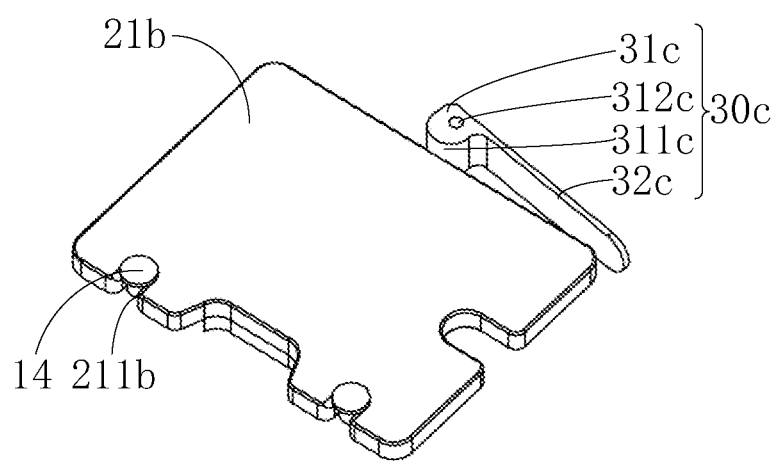
FIG. 11 is a schematic structural diagram of another calibration bracket according to some embodiments of the disclosure, where the upper part of the base and the vertical rod is omitted.

Referring to FIG. 11, in some other embodiments, the transverse force application member 30c is an eccentric wrench, to replace the transverse force application member 30a in the embodiment of the push-pull structure. The transverse force application member is configured to connect the vertical rod 20 to the base 10 in an abutting manner. The transverse force application mating member is at least a part of the vertical rod 20. That is to say, at least a part of a side face of the pedestal 21b. The other technical content is basically the same as the content of the embodiment of the push-pull structure.

The transverse force application member 30c is disposed on the opposite side of the two limiting openings 211a. The transverse force application member 30c includes an abutting portion 31c and a pull handle 32c. The abutting portion 31c includes a curved abutting face 311c. An eccentric hole 312c is formed on the abutting portion 31c. The eccentric hole 312c deviates from a geometric contour center of the curved abutting face 311c. The pull handle 32c is fixedly connected to the abutting portion 31c. The eccentric hole 312c of the abutting portion 31c is pivotally connected to the base body 11. The curved abutting face 311c is disposed opposite to the side face of the pedestal 21b. The abutting portion 31c is rotatable about the eccentric hole 312c relative to the base body 11, to change relative positions of the curved abutting face 311c and the pedestal 21b.

In this embodiment, after the two limiting protrusions 14 are snapped to the limiting opening 211a, the pull handle 32c is rotated about the eccentric hole 312c in the direction toward the vertical rod 20. The curved abutting face 311c abuts against a side face of the pedestal 21b. Therefore, the vertical rod 20 is fastened to the base 10.

The pull handle may be rotated about the eccentric hole 312c in a direction away from the vertical rod 20. The curved abutting face 311c is out of contact with the pedestal 21b, thereby detaching the vertical rod 20 from the base 10.

It may be understood that, in some other embodiments, the pedestal 21b may be omitted. The transverse force application member 30c is configured to mate with the vertical rod 20. The curved abutting face 311c of the abutting portion 31c may directly abut against a side wall of the vertical rod 20.

Referring to FIG. 12, in some other embodiments, the limiting component is a horizontal structure. The limiting component includes a transverse force application member 30d and a transverse force application mating member 22c. The transverse force application mating member 22c may be substantially perforated. The formed perforated structure includes a tapered inclined face. The vertical rod 20 includes a pedestal 21c. The pedestal 21c is located at the bottom of the vertical rod 20. The vertical rod 20 is integrally formed. The transverse force application mating member 22c is disposed on the pedestal 21c.

The quantity of the transverse force application members 30d is three. The three transverse force application members 30d are regularly disposed around the vertical rod with the vertical rod 20 as the center. The three transverse force application members 30d are distributed in an isosceles triangle. Three transverse force application mating members 22c in a one-to-one correspondence with the three transverse force application members 30d are disposed on the pedestal 21c. The transverse force application mating members 22c are configured to be connected to the transverse force application members 30d. The transverse force application members 30d are fixedly connected to the vertical rod 20 and the pedestal 21c.

Since the transverse force application mating member 22c includes a tapered inclined face, even though the force application direction of the transverse force application member 30d is vertically downward, a transverse force may still be applied to the pedestal 21c. It may be understood that, the transverse force application mating member 22c may further include inclined faces of other structures, as long as the transverse force can be applied to the pedestal 21c.

It may be understood that, in some other embodiments, the quantity of transverse force application members 30d is not limited to three. For example, four transverse force application members 30d are respectively disposed on four sides of the vertical rod 20. The four transverse force application members 30d are distributed in a prismatic shape.

Figure 13:
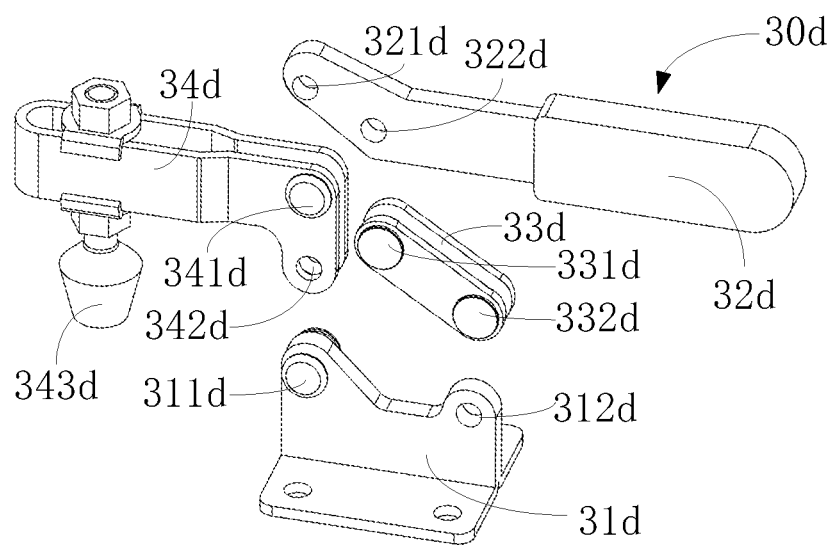
FIG. 13 is an exploded view of a transverse force application member of FIG. 12.

Referring to FIG. 13, the transverse force application member 30d includes a pivot seat 31d, a pull handle 32d, a side link 33d and a connector 34d.

The pivot seat 31d is fixedly mounted to the base body 11. A first pivot shaft 311d is provided on a front end of the pivot seat 31d. A first pivot hole 312d is provided on a rear end of the pivot seat 31d.

A first rotating shaft 331d and a second rotating shaft 332d are respectively provided on front and rear ends of the side link 33d. The second rotating shaft 332d is pivotally connected to the first pivot hole 312d. The side link 33d is rotatable about the first pivot hole 312d relative to the pivot seat 31d.

A second pivot shaft 341d and a second pivot hole 342d are respectively provided above and below one end of the connector 34d. The second pivot hole 342d is pivotally connected to the first pivot shaft 311d of the pivot seat 31d. The connector 34d is rotatable about the first pivot shaft 311d relative to the pivot seat 31d. A fixing head 343d is provided on an other end of the connector 34d. The fixing head 343d is fixedly connected to the connector 34d. The fixing head 343d is used to be snugly clasped to the transverse force application mating member 22c, so that the vertical rod 20 is fastened to the base. The fixing head 343d includes a tapered inclined face. The tapered inclined face of the fixing head 343d is mated with the tapered inclined face of the transverse force application mating member 22c. Both the tapered inclined faces are disposed as an inverted tapered face. When the fixing head 343d is snugly clasped to the transverse force application mating member 22c, the tapered inclined face of the fixing head 343d presses the tapered inclined face of the transverse force application mating member 22c. The transverse force application member 30d presses the transverse force application mating member 22c against the base 10 while generating a transverse component force parallel to the base 10. One of the fixing heads 343d is disposed corresponding to one of the transverse force application mating members 22c.

A third pivot hole 321d and a fourth pivot hole 322d are formed on the pull handle 32d. The third pivot hole 321d and the fourth pivot hole 322d are disposed front and rear. The third pivot hole 321d is pivotally connected to the second pivot shaft 341d of the fixing head 343d. The fourth pivot hole 322d is pivotally connected to the first rotating shaft 331d of the side link. Rotating the pull handle 32d causes the fixing head 343d to move up and down relative to the transverse force application mating member 22c.

The pivot seat 31d, the side link 33d, the connector 34d and the pull handle 32d constitute a double-rocker mechanism.

It may be understood that, according to actual needs, the pivot seat 31d and the connector 34d may be omitted. One end of the side link 33d is pivotally connected to the base body 11. One end of the fixing head 343d is pivotally connected to the base body 11. The pull handle 32d is respectively pivotally connected to an other end of the side link 33d and an other end of the fixing head 343d.

In this embodiment, after the vertical rod 20 is placed at a predetermined position, one of the fixing heads 343d corresponds to one of the transverse force application mating members 22c. Each of the pull handles 32d is pulled in a direction away from the vertical rod 20. Each of the connectors 34d rotates about the first pivot shaft 311d of a corresponding one of the pivot seats 31d. A corresponding one of the fixing heads 343d is snugly clasped to a corresponding one of the transverse force application mating members 22c from top to bottom. The three fixing heads 343d respectively apply constraint forces in different directions to the three transverse force application mating members 22c. The constraint forces can be resolved into a vertical pressure perpendicular to the base body 11 and a transverse pull force parallel to the base body 11, to prevent the movement of the vertical rod 20 relative to the base. In addition, the vertical rod 20 is subjected to its own gravity. The bottom face of the vertical rod naturally abuts against the base body 11. The vertical rod 20 is fastened to the base body 11. At this point, the third pivot hole 321d and the fourth pivot hole 322d of the pull handle 32d and the first pivot hole 312d of the pivot seat 31d are located on the same straight line. The mechanism is at the dead center position. No matter how much reacting force the pedestal 21c applies to the fixing head 343d, the fixing head 343d cannot be detached from the transverse force application mating member 22c.

The pull handle 32d can be pulled toward the vertical rod 20, so that the fixing head 343d is detached from the transverse force application mating member 22c from bottom to top. In this way, the vertical rod 20 is detached from the base.

It may be understood that, in some other embodiments, the limiting opening 211a and the limiting protrusion 14 that are mated with each other may be respectively provided on the base 10 and the vertical rod 20. Then a transverse force application member 30d and a transverse force application mating member 22c are individually provided on the base 10 and the vertical rod 20. The transverse force application member 30d may be snapped to the transverse force application mating member 22c. The limiting protrusion 14 snugly abuts against the limiting opening 211a. The vertical rod 20 is fastened to the base 10.

Figure 14:
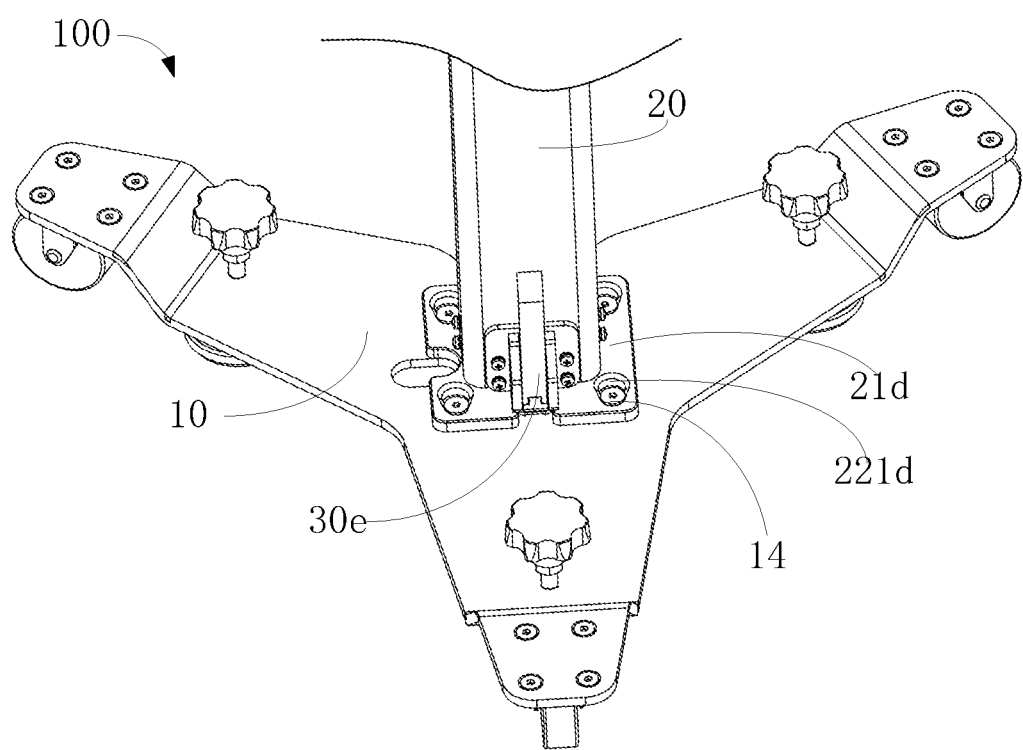
FIG. 14 is a schematic structural diagram of another calibration bracket according to some embodiments of the disclosure.
Figure 15:
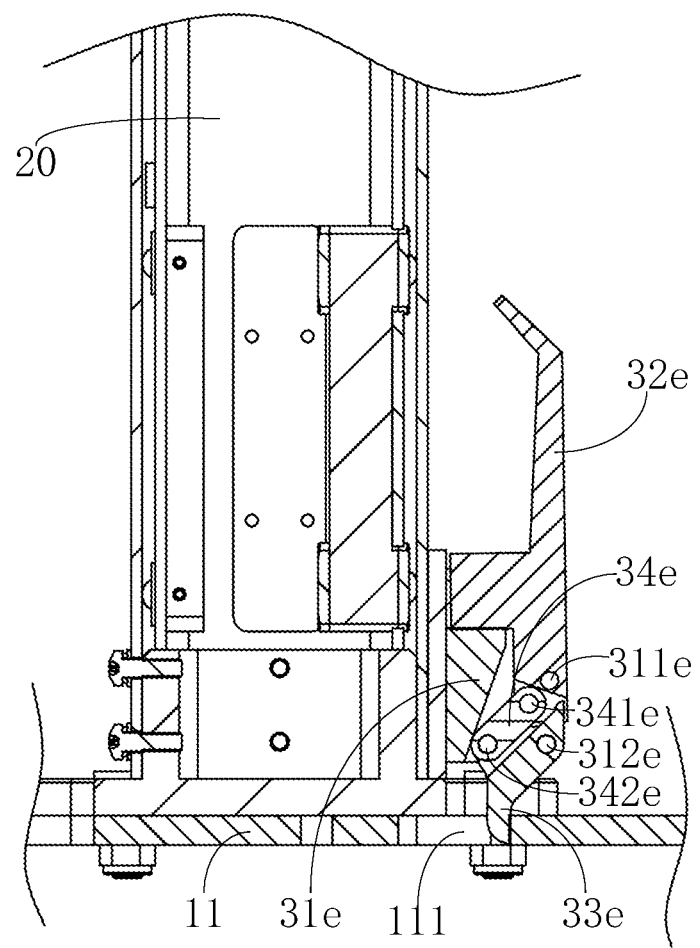
FIG. 15 is a cross-sectional view of a partial structure of FIG. 14.
Figure 16:
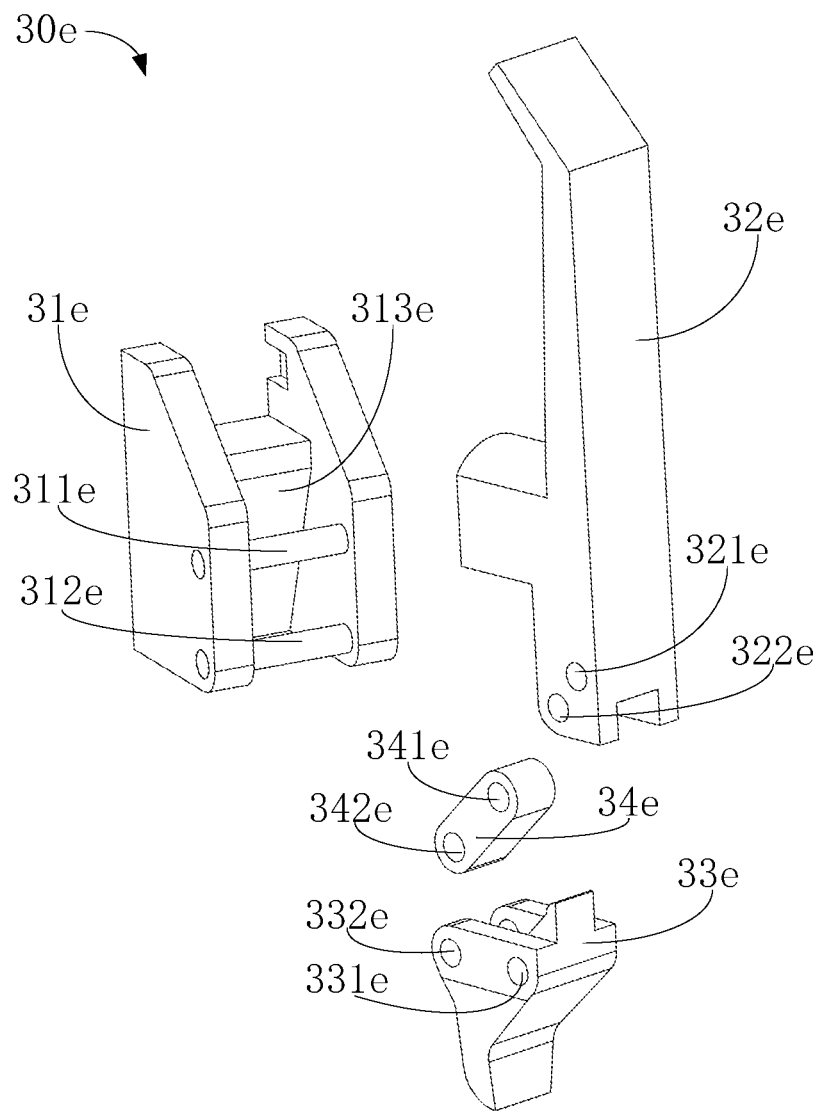
FIG. 16 is a structural exploded view of a transverse force application member.
Figure 17:
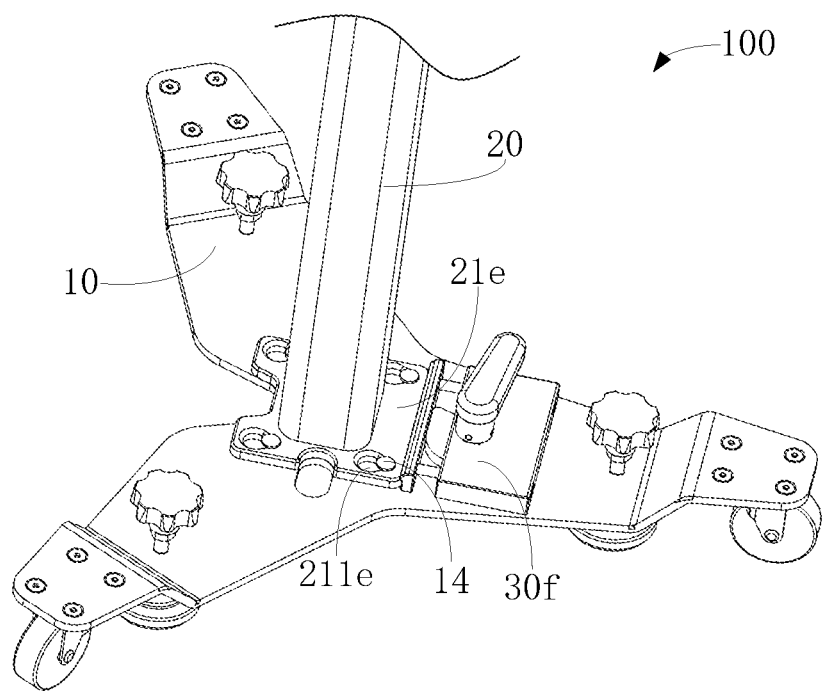
FIG. 17 is a schematic structural diagram of another calibration bracket according to some embodiments of the disclosure.

Referring to FIG. 14 to FIG. 16, in some other embodiments, the limiting component is a clasp structure and includes a transverse force application member 30e. The transverse force application member 30e is mounted to a side face of the vertical rod 20. A fixing port 111 mated with the transverse force application member 30e is formed on the base body 11. The transverse force application member 30e snugly abuts against the fixing port 111 to apply a transverse force to the vertical rod 20.

The transverse force application member 30e includes a pivot seat 31e, a pull handle 32e, an abutting portion 33e and a link 34e.

The pivot seat 31e is fixedly mounted to the vertical rod 20. A first pivot shaft 311e and a second pivot shaft 312e are provided for the pivot seat 31e. The first pivot shaft 311e and the second pivot shaft 312e are disposed up and down. An inclined abutting face 313e is further provided for the pivot seat 31e. The inclined abutting face 313e is opposite to the first pivot shaft 311e and the second pivot shaft 312e.

A first pivot hole 321e and a second pivot hole 322e are formed on the pull handle 32e. The first pivot hole 321e and the second pivot hole 322e are disposed up and down. The first pivot hole 321e of the pull handle 32e is pivotally connected to the first pivot shaft 311e. The pull handle 32e is rotatable about the first pivot shaft 311e relative to the pivot seat 31e.

A third pivot hole 331e and a fourth pivot hole 332e are provided for the abutting portion 33e. The third pivot hole 331e is pivotally connected to the second pivot shaft 312e. The abutting portion 33e is rotatable about the second pivot shaft 312e relative to the pivot seat 31e.

It may be understood that, the pivot seat 31e may be omitted according to the actual situation. The pull handle 32e and the abutting portion 33e may be directly pivotally connected to the vertical rod 20, respectively. The inclined abutting face 313e may be directly disposed on the vertical rod 20.

A fifth pivot hole 341e and a sixth pivot hole 342e are disposed on two ends of the link 34e. The fifth pivot hole 341e may be pivotally connected to the second pivot hole 322e through a pin shaft. The sixth pivot hole 342e may be pivotally connected to the fourth pivot hole 332e through the pin shaft. The link 34e may rotate together with the pull handle 32e through the pin shaft.

Rotating the pull handle 32e causes the sixth pivot hole 342e of the link 34e to drive, through the pin shaft, the abutting portion 33e to rotate about the second pivot shaft 312e relative to the pivot seat 31e while the link 34e is rotating about the first pivot shaft 311e. The abutting portion 33e snugly abuts against an inner side wall of the fixing port 111 or is detached from the inner side wall of the fixing port 111 during rotation. When the abutting portion 33e snugly abuts against the inner side wall of the fixing port 111, the abutting portion 33e simultaneously snugly abuts against the inclined abutting face 313e. The abutting portion 33e is locked. When the abutting portion 33e snugly abuts against the inner side wall of the fixing port 111, the abutting portion 33e applies a transverse force to the vertical rod 20.

The vertical rod 20 includes a pedestal 21d. The pedestal 21d is located at the bottom of the vertical rod 20. The vertical rod 20 is integrally formed.

A limiting opening 221d is provided on the pedestal 21d. A limiting protrusion 14 mated with the limiting opening 221d is provided on the vertical rod 20. The limiting opening 221d can allow the limiting protrusion 14 to pass through and snugly abut against the limiting protrusion 14 when the transverse force application member 30e applies the transverse force to the vertical rod 20. The structure of the limiting opening 221d is basically the same as that of the limiting opening 211a of the embodiment shown in FIG. 5 to FIG. 6. A difference is that the larger hole of the limiting opening 221d is disposed farther away from the transverse force application member 30e than the smaller hole. That is to say, the larger hole and the smaller hole are disposed in a direction related to the direction of the transverse force applied by the transverse force application member 30e to the vertical rod 20. The structure of the limiting protrusion 14 is disposed in the same manner as that of the limiting protrusion 14 in the embodiments shown in FIG. 5 to FIG. 6.

In this embodiment, four limiting openings 221d are formed on the pedestal 21d. Four limiting protrusions 14 are correspondingly provided on the base body 11. One of the limiting openings 221d corresponds to one of the limiting protrusions 14.

It may be understood that the quantity of the limiting openings 221d and the limiting protrusions 14 may be set according to actual needs. For example, the quantity may be two or three. Only one limiting opening 221d corresponds to one limiting protrusion 14. The limiting opening 221d may also be disposed on the base body 11. The limiting protrusion 14 is correspondingly disposed on the pedestal 21d.

In this embodiment, after the four limiting protrusions 14 are respectively snapped to the limiting opening 221d, the pull handle 32e is rotated about the first pivot shaft 311e in the direction toward the vertical rod 20. One end of the abutting portion 33e rotates about the second pivot shaft 312e toward a side wall of the fixing port 111. One end of the abutting portion 33e abuts against the side wall of the fixing port 111. In addition, the transverse force application member 30e applies a transverse force to the vertical rod 20. The first abutting face of the limiting protrusion 14 snugly abuts against the second abutting face of the limiting opening 221d. The limiting opening 221d is tightly connected to the limiting protrusion 14, and the vertical rod 20 is snugly pressed against the base 10. In this way, the vertical rod 20 is fastened to the base 10. In addition, one end of the abutting portion 33e having the fourth pivot hole 332e abuts against the inclined abutting face 313e. The transverse force application member 30e and the fixing port 111 are in a locked state. Even if a side wall of the fixing port 111 applies a reverse push force to one end of the abutting portion 33e, the end of the abutting portion 33e cannot be detached from the side wall of the fixing port 111.

The pull handle may be rotated about the first pivot shaft 311e in a direction away from the vertical rod 20. One end of the abutting portion 33e rotates about the second pivot shaft 312e to detach one end of the abutting portion 33e from one side wall of the fixing port 111. In this way, the vertical rod 20 is detached from the base 10.

It may be understood that, in some other embodiments, the transverse force application member 30e may be disposed on the base body 11. The fixing port 111 is disposed on the pedestal 21d. The transverse force application member 30e snugly abuts against the fixing port 111 to apply a transverse force to the vertical rod 20.

Figure 18:
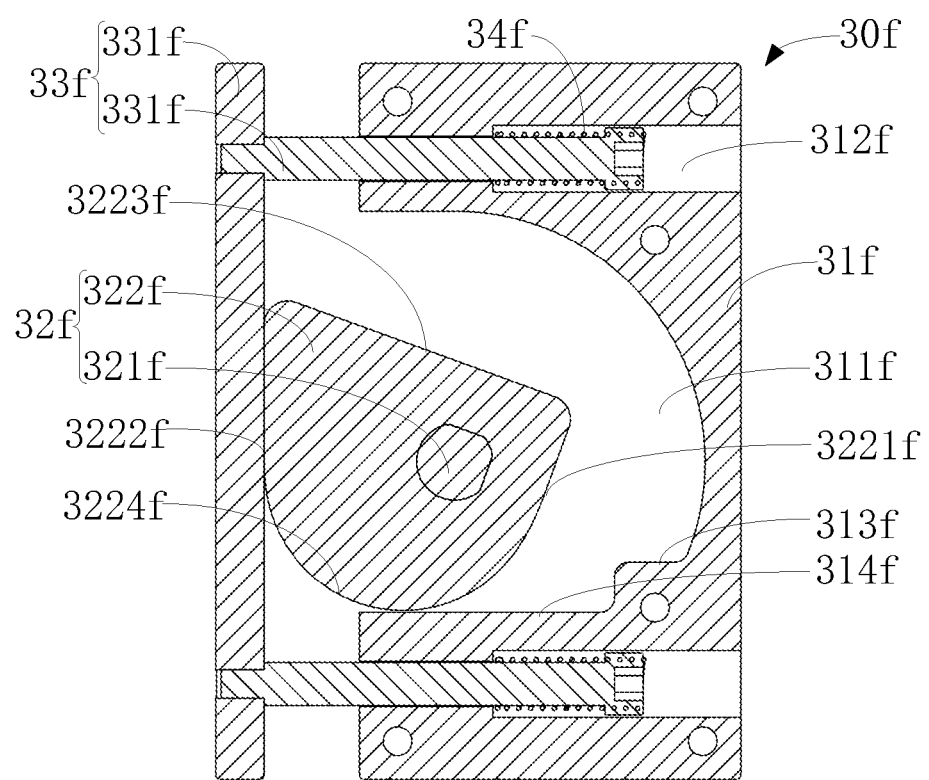
FIG. 18 is a cross-sectional view of a transverse force application member of FIG. 17.
Figure 19:
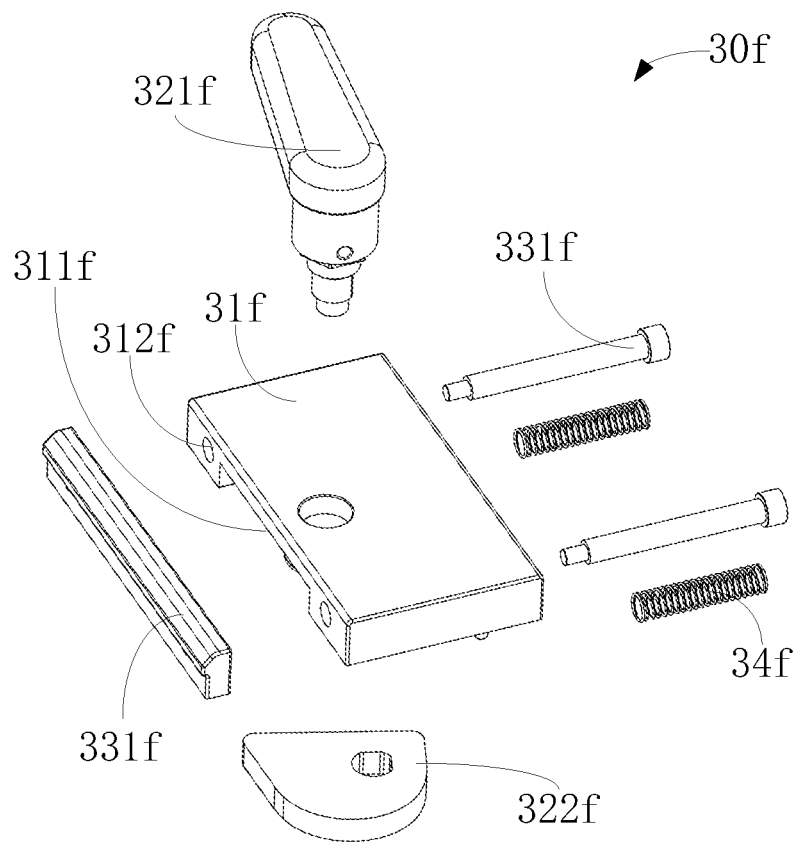
FIG. 19 is an exploded view of a transverse force application member of FIG. 17.

Referring to FIG. 16 and FIG. 18, in some other embodiments, the limiting component includes a transverse force application member 30f. The transverse force application member 30f is mounted to the base body 11 and is located on one side of the vertical rod 20. The transverse force application member 30f snugly abuts against the vertical rod 20 to apply the transverse force to the vertical rod 20.

The transverse force application member 30f includes a mounting box 31f, a cam mechanism 32f, an abutting mechanism 33f and an elastic member 34f.

The mounting box 31f is fixedly mounted to the base body 11. A receiving cavity 311f for mounting the cam mechanism 32f and a counterbore 312f for mounting the elastic member 34f and the abutting mechanism 33f are provided in the mounting box 31f.

The cam mechanism 32f is rotatably mounted to the mounting box 31f and is rotatable about a rotation axis of the mounting box relative to the mounting box 31f. The rotation axis is perpendicular to the base body 11.

The cam mechanism 32f includes a pull handle 321f and a cam 322f. The cam 322f is an eccentric cam. The pull handle 321f can pass through the mounting box 31f through a rotating shaft to be connected to the cam 322f. The cam 322f is at least partially received in the receiving cavity 311f. The pull handle 321f is placed outside the receiving cavity 311f. The cam 322f can be synchronously driven by rotating the pull handle 321f to rotate in the receiving cavity 311f.

The cam 322f includes a first plane 3221f, a second plane 3222f, a third plane 3223f and an arc face 3224f in arc transition with the first plane 3221f and the second plane 3222f. The first plane 3221f, the arc face 3224f, the second plane 3222f and the third plane 3223f are sequentially connected to form a peripheral side face of the cam 322f. The receiving cavity 311f is roughly a quarter-circle sector. A first step face 313f and a second step face 314f are provided in the receiving cavity 311f. The first step face 313f is connected to the sector-shaped arc face 3224f. When the cam 322f rotates, the third plane 3223f may at least partially abut against the first step face 313f. The first step face 313f is used to limit a rotation angle of the cam 322f. A height difference between the first step face 313f and the second step face 314f is used to allow a connecting part of the first plane 3221f and the third plane 3223f to rotate.

The abutting mechanism 33f is slidably mounted to the mounting box 31f and is slidable toward the vertical rod 20 or away from the vertical rod 20 relative to the mounting box 31f upon abutting of the cam mechanism 32f.

The abutting mechanism 33f includes a pushing block 331f and an urging post 332f. One end of the urging post 332f is fixedly connected to the pushing block 331f. The urging post 332f is slidably mounted to the counterbore 312f. The urging post 332f is at least partially received in the counterbore 312f. The push block 331f is placed outside the counterbore 312f in an axial direction and is disposed opposite to one side face of the vertical rod 20. A limiting portion is provided on an other end of the urging post 332f. The limiting portion is received in a part of the counterbore 312f with a larger aperture, so that the abutting mechanism 33f cannot be removed from the mounting box 31f.

The elastic member 34f elastically abuts between the abutting mechanism 33f and the mounting box 31f. When the cam 322f is detached from the push block 331f, the cam 322f is detached from the vertical rod 20 under the elastic force of the elastic member 34f and returns to an initial position. Specifically, the elastic member 34f is sleeved on the urging post 332f and is accommodated in the part of the counterbore 312f with a larger aperture. One end of the elastic member 34f abuts against the limiting portion. An other end of the elastic member 34f is limited to an end face of the counterbore 312f. The elastic member 34f may be a compression spring, a leaf spring or the like. Preferably, the two urging posts 332f are respectively fixedly connected to two ends of the push block 331f through threads. The cam mechanism 32f is located between the two urging posts 332f.

When the pull handle 321f is rotated to cause the push block 331f to be pressed by the cam 322f to move away from the mounting box 31f, the limiting portion and the end face of the counterbore 312f squeeze the elastic member 34f to compress the elastic member 34f. When the pull handle 321f is rotated to cause the cam 322f to move away from the push block 331f, the elastic member 34f restores deformation. Under the elastic force of the elastic member 34f, the urging post 332f drives the push block 331f to return to the initial position.

The vertical rod 20 includes a pedestal 21e. The pedestal 21e is located at the bottom of the vertical rod 20. The vertical rod 20 is integrally formed. The mounting box 31f and the pedestal 21e are disposed at a predetermined distance to allow the push block 331f to abut against or be detached from the pedestal 21e. The push block 331f is disposed opposite to one side face of the pedestal 21e.

A limiting opening 211e is provided on the pedestal 21e. A limiting protrusion 14 mated with the limiting opening 211e is provided on the base body 11. The limiting opening 211e can allow the limiting protrusion 14 to pass through and snugly abut against the limiting protrusion 14 when the transverse force application member 30f applies the transverse force to the vertical rod 20. The structure of the limiting opening 211e is basically the same as that of the limiting opening 211a of the embodiment shown in FIG. 5 to FIG. 6. A difference is that the larger hole of the limiting opening 211e is disposed farther away from the transverse force application member 30f than the smaller hole. That is to say, the larger hole and the smaller hole are disposed in a direction related to the direction of the transverse force applied by the transverse force application member 30f to the vertical rod 20. The structure of the limiting protrusion 14 is disposed in the same manner as that of the limiting protrusion 14 in the embodiments shown in FIG. 5 to FIG. 6.

In this embodiment, four limiting openings 211e are formed on the pedestal 21e. Four limiting protrusions 14 are correspondingly provided on the base body 11. One of the limiting openings 211e corresponds to one of the limiting protrusions 14.

In this embodiment, after the four limiting protrusions 14 are respectively snapped to the limiting opening 211e, the pull handle 321f may be rotated counterclockwise. The cam 322f rotates about its rotation axis to the second plane 3222f to overlap with the push block 331f in parallel. At this point, the push block 331f is pushed against the pedestal 21e by the cam 322f to snugly abut against the side face of the pedestal 21e. The elastic member 34f is in a compressed state. The transverse force application member 30f applies a transverse force to the vertical rod 20. In addition, the first abutting face of the limiting protrusion 14 snugly abuts against the second abutting face of the limiting opening 211e. The limiting opening 211e is tightly connected to the limiting protrusion 14. The vertical rod 20 is snugly pressed against the base, thereby fastening the vertical rod 20 to the base. Since the cam 322f is an eccentric cam, when the second plane 3222f and the push block 331f overlap in parallel, the cam 322f is in a locked state. Even if the pedestal 21e applies a reverse push force to the push block 331f, the push block 331f cannot be detached from the pedestal 21e.

The pull handle 321f may be rotated in a clockwise direction. The cam 322f rotates about its rotation axis to the third plane 3223f to abut against the second step face 314f. In addition, the cam 322f is detached from the push block 331f. The push block 331f is restored to the initial position under the elastic force of the elastic member 34f. That is to say, the push block 331f is detached from the pedestal 21e. The vertical rod 20 can be detached from the base.

It may be understood that when no limiting structure is disposed between the vertical rod 20 and the base 10, a positioning structure can be disposed between the vertical rod 20 and the base. For example, a groove or a concave face or a positioning hole, etc. is provided on the vertical rod 20. A convex rail or a convex face or a positioning post, etc. is provided on the base 10. The vertical rod 20 can be quickly placed in an accurate position through the positioning structure. The positioning structure can also limit the vertical rod 20 to a certain extent.

It should be noted that, the specification of the disclosure and the accompanying drawings thereof illustrate preferred embodiments of the disclosure. However, the disclosure can be implemented in various different forms, and is not limited to the embodiments described in this specification. These embodiments are not intended to be an additional limitation on the content of the disclosure, and are described for the purpose of providing a more thorough and comprehensive understanding of the content disclosed in the disclosure. Moreover, the above technical features can further be combined to form various embodiments not listed above. All such embodiments shall be construed as falling within the scope of the disclosure. Further, those of ordinary skill in the art may make improvements and variations according to the above descriptions. Such improvements and variations shall all fall within the protection scope of the appended claims of the disclosure.

What is claimed is:

1. A calibration bracket, comprising:
a base;
a vertical rod detachably mounted to the base;
a transverse force application member disposed on one of the base and the vertical rod; and
a transverse force application mating member disposed on the other of the base and the vertical rod, the transverse force application mating member being configured to be mated with the transverse force application member to apply, to the vertical rod, a transverse force parallel to the base,
wherein the number of the transverse force application member is at least two, the number of the transverse force application mating member is at least two,
all transverse forces applied to the vertical rod are combined into a pair of balance forces on a plane parallel to the base, to cause the vertical rod to be subjected to the pair of balance forces and to be fastened to the base;
wherein a limiting protrusion is provided on one of the base and the vertical rod, and a limiting opening is provided on the other of the base and the vertical rod, the limiting opening allowing the limiting protrusion to pass through the limiting opening and snugly abutting against the limiting protrusion when the transverse force application member applies the transverse force to the vertical rod.

2. The calibration bracket according to claim 1, wherein the limiting opening is a through hole composed of a larger hole and a smaller hole that are in communication with each other, and the limiting protrusion is snapped to the smaller hole after passing through the larger hole.

3. The calibration bracket according to claim 2, wherein the limiting protrusion has a cap-shaped end configured to prevent separation of the vertical rod from the base in a direction perpendicular to the base when the limiting protrusion snugly abuts against the limiting opening.

4. The calibration bracket according to claim 3, wherein the cap-shaped end comprises a first abutting face, and the limiting opening comprises a second abutting face, the first abutting face being mated with the second abutting face, and when the transverse force application member applies the transverse force to the vertical rod, the first abutting face snugly abutting against the second abutting face, so that the vertical rod is snugly pressed against the base.

5. The calibration bracket according to claim 1, wherein the transverse force application member comprises a pull handle and a clasp member,
the pull handle being pivotally connected to the base and being rotatable about a pivot joint,
one end of the clasp member being connected to the pull handle and being rotatable with the pull handle, and rotating the pull handle causing an other end of the clasp member to be snugly clasped to or be detached from the transverse force application mating member.

6. The calibration bracket according to claim 1, wherein the transverse force application member comprises a pull handle, a link and a push shaft,
the pull handle being pivotally connected to the base and being rotatable about a pivot joint,
the push shaft being slidably mounted in a guide hole provided on the base,
two ends of the link being respectively pivotally connected to the pull handle and the push shaft, and
rotating the pull handle causing the push shaft to slide along the guide hole, so as to abut against or be detached from the transverse force application mating member.

7. The calibration bracket according to claim 6, wherein the transverse force application mating member comprises a flange, the push shaft abutting against the flange, so that the base is fixedly connected to the vertical rod.

8. The calibration bracket according to claim 1, wherein the vertical rod comprises a pedestal, and the transverse force application mating member is a perforated structure disposed on the pedestal or the base, the perforated structure comprising an inclined face, the transverse force application member being snugly snapped to the inclined face of the transverse force application mating member, so that the base is fixedly connected to the vertical rod.

9. A calibration bracket, comprising:
a base;
a vertical rod detachably mounted to the base;
a transverse force application member disposed on one of the base and the vertical rod, the transverse force application member being configured to be mated with the vertical rod to apply, to the vertical rod, a transverse force parallel to the base,
wherein the number of the transverse force application member is at least two,
all transverse forces applied to the vertical rod are combined into a pair of balance forces on a plane parallel to the base, to cause the vertical rod to be subjected to the pair of balance forces and to be fastened to the base;
wherein a limiting protrusion is provided on one of the base and the vertical rod, and a limiting opening is provided on the other of the base and the vertical rod, the limiting opening allowing the limiting protrusion to pass through the limiting opening and snugly abutting against the limiting protrusion when the transverse force application member applies the transverse force to the vertical rod.

10. The calibration bracket according to claim 9, wherein the limiting opening is a through hole composed of a larger hole and a smaller hole that are in communication with each other, and the limiting protrusion is snapped to the smaller hole after passing through the larger hole.

11. The calibration bracket according to claim 9, wherein the transverse force application member comprises a pull handle, a link and a push shaft,
the pull handle being pivotally connected to the base and being rotatable about a pivot joint,
the push shaft being slidably mounted in a guide hole provided on the base,
two ends of the link being respectively pivotally connected to the pull handle and the push shaft, and
rotating the pull handle causing the push shaft to slide along the guide hole, so as to abut against or be detached from a side wall of the vertical rod.

12. The calibration bracket according to claim 9, wherein the transverse force application member comprises an abutting portion and a pull handle,
the abutting portion being pivotally connected to the base and being rotatable relative to the base,
the pull handle being fixedly connected to the abutting portion, and
rotating the pull handle causing at least a part of the abutting portion to be snugly pressed against or be detached from a side wall of the vertical rod.

13. The calibration bracket according to claim 9, wherein the transverse force application member comprises a pull handle, a link and an abutting portion,
the pull handle being pivotally connected to the vertical rod,
the abutting portion being pivotally connected to the vertical rod,
two ends of the link being respectively pivotally connected to the pull handle and the abutting portion, and
rotating the pull handle causing the abutting portion to snugly abut against or be detached from a side wall of a fixing port formed on the base that is mated with the transverse force application member.

14. The calibration bracket according to claim 13, wherein the transverse force application member further comprises an inclined abutting face disposed on the vertical rod, and when the abutting portion snugly abuts against an inner side wall of the fixing port, the abutting portion simultaneously snugly abutting against the inclined abutting face, so that the abutting portion is locked.

15. The calibration bracket according to claim 9, wherein the transverse force application member comprises a mounting box, a cam mechanism and an abutting mechanism,
the mounting box being mounted to the base,
the cam mechanism being rotatably mounted to the mounting box,
the abutting mechanism being slidably mounted to the mounting box and snugly abutting against or being detached from the vertical rod upon abutting of the cam mechanism, and
rotating the cam mechanism causing the abutting mechanism to snugly abut against the vertical rod.

16. The calibration bracket according to claim 15, wherein the transverse force application member further comprises an elastic member disposed between the abutting mechanism and the mounting box, and when the cam mechanism is detached from the abutting mechanism, the elastic member springs back, so that the abutting mechanism is detached from the vertical rod under the action of an elastic force of the elastic member.

17. A calibration bracket, comprising:
a base;
a vertical rod detachably mounted to the base, the vertical rod comprising a pedestal;
at least two transverse force application members disposed on one of the base and the vertical rod; and
at least two transverse force application mating members disposed on the other of the base and the vertical rod, each of the transverse force application mating members being configured to be connected to a corresponding one of the transverse force application members to apply, to the vertical rod, a transverse force parallel to the base, wherein
all transverse forces applied to the vertical rod are combined into a pair of balance forces on a plane parallel to the base, the pedestal extending at least in opposite directions perpendicular to the pair of balance forces.

18. The calibration bracket according to claim 17, wherein the transverse force application member comprises a pull handle and a clasp member,
- the pull handle being pivotally connected to the base and being rotatable about a pivot joint,
- one end of the clasp member being connected to the pull handle and being rotatable with the pull handle, and
- rotating the pull handle causing an other end of the clasp member to be snugly clasped to or be detached from the transverse force application mating member.

19. The calibration bracket according to claim 17, wherein the pull handle has an adjustment hole, the clasp member passes through the adjustment hole, and the clasp member is movable along the adjustment hole and is fixed to a preset position.

20. The calibration bracket according to claim 17, wherein the vertical rod comprises a pedestal, and the transverse force application mating member is a perforated structure disposed on the pedestal or the base, the perforated structure comprising an inclined face, each of the transverse force application members being snugly snapped to the inclined face of a corresponding one of the transverse force application mating members, so that the base is fixedly connected to the vertical rod.

* * * * *